US011079789B2

United States Patent
Ford et al.

(10) Patent No.: US 11,079,789 B2
(45) Date of Patent: Aug. 3, 2021

(54) PEDAL ASSEMBLY FOR AUTONOMOUS VEHICLES

(71) Applicant: KSR IP Holdings, LLC, Wilmington, DE (US)

(72) Inventors: Andrew Ford, Rodney (CA); Derek Jackson, Dresden (CA)

(73) Assignee: KSR IP Holdings, LLC, Wilmington, DE (US)

( * ) Notice: Subject to any disclaimer, the term of this patent is extended or adjusted under 35 U.S.C. 154(b) by 0 days.

(21) Appl. No.: 17/066,039

(22) Filed: Oct. 8, 2020

(65) Prior Publication Data

US 2021/0109560 A1 Apr. 15, 2021

Related U.S. Application Data

(60) Provisional application No. 62/913,449, filed on Oct. 10, 2019.

(51) Int. Cl.
*G05G 1/30* (2008.04)
*G05G 1/40* (2008.04)
(Continued)

(52) U.S. Cl.
CPC ............... *G05G 1/40* (2013.01); *B60K 26/02* (2013.01); *B60R 21/09* (2013.01); *G05G 1/01* (2013.01);
(Continued)

(58) Field of Classification Search
CPC . B60R 21/09; G05G 1/30; G05G 1/32; G05G 1/36; G05G 1/40; G05G 1/405;
(Continued)

(56) References Cited

U.S. PATENT DOCUMENTS

| 4,875,385 | A | * | 10/1989 | Sitrin | ........................ B60T 7/04 74/512 |
| 6,179,079 | B1 | | 1/2001 | Basnett | |
| 6,182,525 | B1 | | 2/2001 | Bowers et al. | |
| 6,367,348 | B1 | * | 4/2002 | Toelke | ................... G05G 1/405 74/512 |

(Continued)

FOREIGN PATENT DOCUMENTS

| CN | 203902400 U | 10/2014 |
| EP | 1488963 A1 | 12/2004 |
| JP | 2016168927 A | 9/2016 |

OTHER PUBLICATIONS

International Search Report dated Jan. 29, 2021; International Application No. PCT/US2020/054776.

*Primary Examiner* — Richard W Ridley
*Assistant Examiner* — Brian J McGovern
(74) *Attorney, Agent, or Firm* — Dinsmore & Shohl LLP

(57) ABSTRACT

A pedal assembly, including an upper housing and a lower housing with an upper surface positioned below the upper housing. A receiving cavity is positioned in the lower housing, with at least a portion positioned below the upper surface in the pedal assembly vertical direction. A pedal arm having a pivot end and an opposite pedal pad, pivotally coupled to the upper housing at the pivot end. The pedal arm is movable between a stowed position and a use position, wherein in the stowed position, the pedal pad is positioned in the receiving cavity and below the upper surface in the pedal assembly vertical direction such that access to the pedal pad is prohibited. In the use position, the pedal pad is positioned above the receiving cavity and the upper surface in the pedal assembly vertical direction such that access to the pedal pad is permitted.

20 Claims, 14 Drawing Sheets

(51) Int. Cl.
  *B60K 26/02* (2006.01)
  *G05G 1/01* (2008.04)
  *G05G 1/44* (2008.04)
  *B60R 21/09* (2006.01)
  *B62D 25/20* (2006.01)
  *B60T 7/06* (2006.01)
  *B60K 23/00* (2006.01)
  *B60K 23/02* (2006.01)

(52) U.S. Cl.
  CPC ............... *G05G 1/44* (2013.01); *B60K 23/02* (2013.01); *B60K 2023/005* (2013.01); *B60K 2023/025* (2013.01); *B60T 7/06* (2013.01); *B62D 25/20* (2013.01)

(58) Field of Classification Search
  CPC ............ B60T 7/02; B60T 2026/024; B60T 2026/026; B60K 2023/005; B60K 2023/025; B60K 26/02; B60K 2026/024; B60K 2026/026
  See application file for complete search history.

(56) References Cited

U.S. PATENT DOCUMENTS

| | | | |
|---|---|---|---|
| 7,127,964 | B2 | 10/2006 | Slanec |
| 10,889,226 | B1* | 1/2021 | Dean ..................... B60N 3/063 |
| 2002/0194948 | A1* | 12/2002 | Sundaresan ............ G05G 1/405 |
| | | | 74/560 |
| 2003/0084744 | A1* | 5/2003 | Parenteau ............... G05G 1/405 |
| | | | 74/512 |
| 2004/0083846 | A1 | 5/2004 | Sundaresan et al. |
| 2009/0038431 | A1* | 2/2009 | Willemsen ............. G05G 25/02 |
| | | | 74/512 |
| 2009/0193928 | A1 | 8/2009 | Souza et al. |
| 2009/0223319 | A1* | 9/2009 | Choi ....................... G05G 1/36 |
| | | | 74/512 |
| 2011/0132134 | A1* | 6/2011 | Kim ........................ G05G 1/30 |
| | | | 74/514 |
| 2012/0132028 | A1* | 5/2012 | Kim ........................ G05G 1/405 |
| | | | 74/512 |
| 2020/0317152 | A1* | 10/2020 | Ghaffari ................. B60K 26/02 |
| 2020/0339078 | A1* | 10/2020 | Vanheule ................ B60R 21/09 |
| 2020/0398725 | A1* | 12/2020 | Mullen ................... B60R 11/06 |

\* cited by examiner

US 11,079,789 B2

PEDAL ASSEMBLY FOR AUTONOMOUS VEHICLES

CROSS-REFERENCE TO RELATED APPLICATION

The present application claims priority to U.S. Provisional Patent Application Ser. No. 62/913,449 filed on Oct. 10, 2019, and entitled "Combination Pedal Assembly for Autonomous Vehicles," the contents of which are incorporated herein in its entirety.

TECHNICAL FIELD

The present specification generally relates to pedal assemblies and, more specifically, to pedal assemblies that move between a use position and a stowed positon for autonomous driving.

BACKGROUND

Adjustable pedal assemblies for adjusting the position of an accelerator pedal arm, a clutch pedal arm and/or a brake arm to accommodate a driver of a vehicle are well known in the prior art. These adjustable pedal assemblies are typically conventional pedal assemblies providing for adjustability of the pedal arms independent of the main pivot point. Each user of a vehicle may have a different preference into the combination pedal location. However, prior pedal assemblies do not permit the accelerator pedal arm, the clutch pedal arm, and/or the brake pedal arm to be moved such that the floorboard is unobstructed by the pedal assembly for a user's legs and feet to extend during autonomous driving.

Accordingly, there exists a need for a pedal assembly that is configured to move during autonomous driving allowing the user to have unobstructed use of the floorboard.

SUMMARY

In one embodiment, a pedal assembly is provided. The pedal assembly includes a lower housing, a receiving cavity and a pedal arm. The lower housing has an upper surface. The receiving cavity is positioned in the lower housing such that at least a portion of the receiving cavity is positioned below the upper surface in a pedal assembly vertical direction. The pedal arm has a pedal pad. The pedal arm is movable between a stowed position and a use position, wherein in the stowed position, the pedal pad is positioned in the receiving cavity and below the upper surface in the pedal assembly vertical direction such that access to the pedal pad is prohibited. In the use position, the pedal pad is positioned above the receiving cavity and the upper surface in the pedal assembly vertical direction such that access to the pedal pad is permitted.

In another embodiment, a combination pedal assembly is provided. The combination pedal assembly a lower housing, at least one receiving cavity, a first pedal arm and a second pedal arm. The lower housing has an upper surface. The at least one receiving cavity is positioned in the lower housing such that at least a portion of the at least one receiving cavity is positioned below the upper surface in a pedal assembly vertical direction. The first pedal arm has a first pedal pad. The first pedal arm is movable between a stowed position and a use position. The second pedal arm has a second pedal pad. The second pedal arm is movable between the stowed position and the use position. In the stowed position, the first and second pedal pads are positioned in the at least one receiving cavity and below the upper surface in the pedal assembly vertical direction such that access to the first and second pedal pads is prohibited. In the use position, the first and second pedal pads are positioned above the at least one receiving cavity and the upper surface in the pedal assembly vertical direction such that access to the first and second pedal pads is permitted.

In yet another embodiment, a pedal assembly is provided. The pedal assembly includes a floorboard, a lower housing, a receiving cavity and a pedal arm. The lower housing is at least partially positioned the floorboard in a pedal assembly vertical direction. At least a portion of the receiving cavity is positioned below the floorboard in the pedal assembly vertical direction. The pedal arm has a pedal pad. The pedal arm is movable between a stowed position and a use position. In the stowed position, the pedal pad is positioned in the receiving cavity and below the floorboard in the pedal assembly vertical direction such that access to the pedal pad is prohibited. In the use position, the pedal pad is positioned above the receiving cavity and the floorboard in the pedal assembly vertical direction such that access to the pedal pad is permitted.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to a pedal assembly for moving at least one pedal between a use position and a stowed position. The use position is where a user has access to the pedal to permit the pivot movement of the at least one pedal during operation of the vehicle. The stowed position is where access to the at least one pedal is positioned below a floorboard of a vehicle and operation by the user is inhibited. Further, at least one pedal may be adjusted between a plurality of positions while in the use positon to fit a need for the user. The pedal assembly includes an upper housing and an opposite lower housing and the at least one pedal. The at least one pedal may be an accelerator pedal, a brake pedal and/or a clutch pedal. The at least one pedal includes an elongated member that has a pedal pad portion and an opposite pivot end.

The pedal pad is configured for a user to make contact and the pivot end is pivotally coupled to the upper housing such that when the user makes contact with the pedal pad. The elongated member pivots about the pivot end with respect to the upper housing. At least one receiving cavity is disposed within the lower housing below an upper surface and receives the pedal pad of at least one pedal when the pedal assembly is in the stowed position. When the pedal assembly is in the stowed positon, the pedal pad is positioned below the upper surface in a vertical direction such that a user is inhibited from making contact with the pedal pad. As such, the user has unobstructed use of the floorboard. In the use position, the pedal pad is positioned above the upper surface of the lower housing such that the user is permitted to make contact with the pedal pad to pivot or move the elongated member with respect to the upper housing.

Various embodiments of the pedal assembly and the operation of the pedal assembly will be described in more detail herein.

Figure 1:
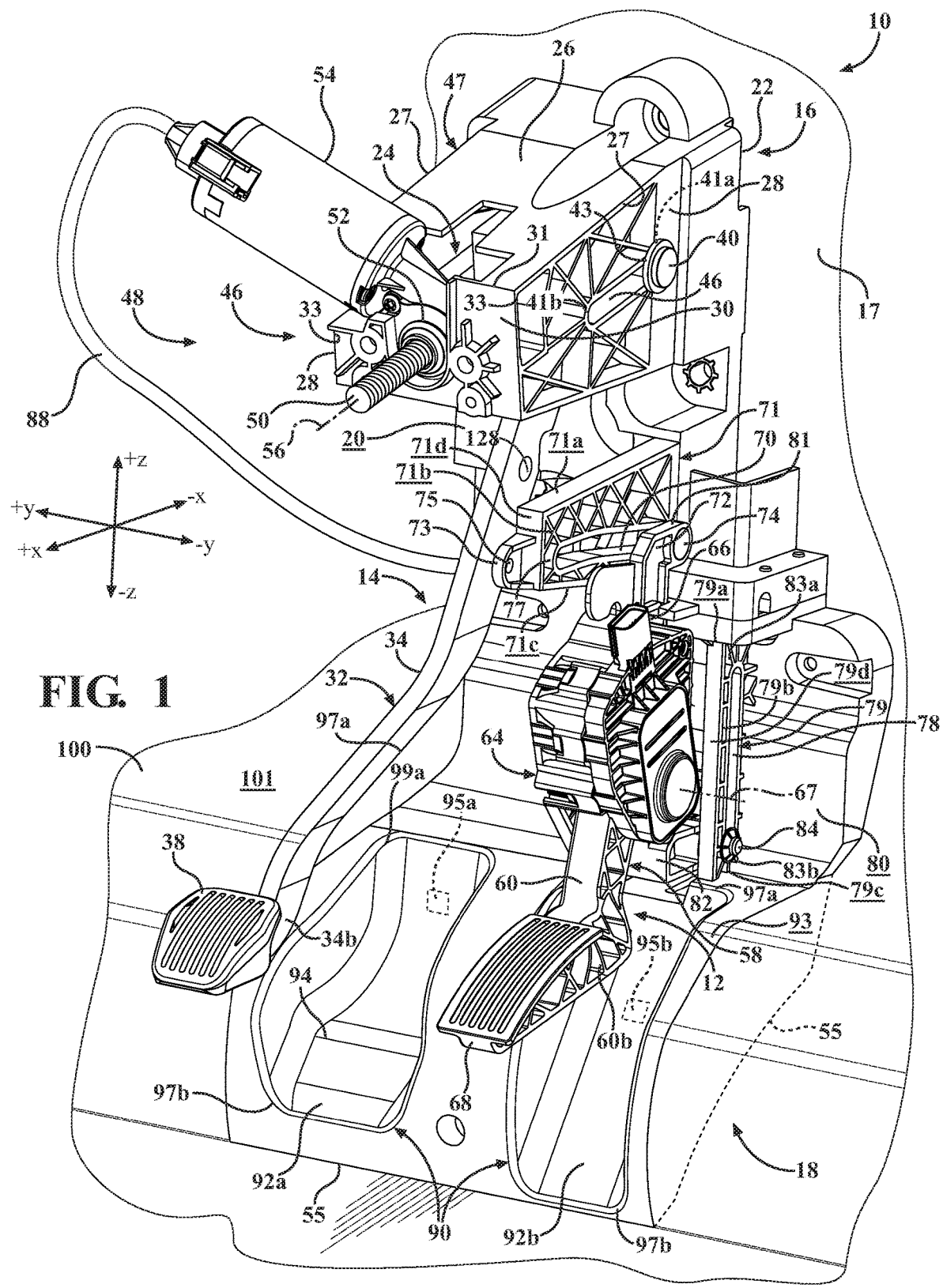
FIG. 1 schematically depicts a perspective view of a pedal assembly in a use position according to one or more embodiments shown and described herein.

As used herein, the term "longitudinal direction" refers to the forward-rearward direction of the pedal assembly (i.e., in a +/−X direction of the coordinate axes depicted in FIG. 1). The term "lateral direction" refers to the cross-direction (i.e., in a +/−Y direction of the coordinate axes depicted in FIG. 1), and is transverse to the longitudinal direction. The term "vertical direction" refers to the upward-downward direction of the pedal assembly (i.e., in a +/−Z-direction of the coordinate axes depicted in FIG. 1). As used herein, "upper" or "above" is defined as generally being towards the positive Z direction of the coordinate axes shown in the drawings. "Lower" or "below" is defined as generally being towards the negative Z direction of the coordinate axes shown in the drawings.

Referring initially to FIGS. 1-5 and 8-12, a pedal assembly 10 is schematically depicted. The pedal assembly 10 includes an accelerator pedal assembly 12 and a pedal assembly 14, which may independently pivot with respect to an upper housing 16 and a lower housing 18, as well as move between a use position and a stowed position, as discussed in greater detail herein. While the pedal assembly 10 is illustrated as being a combination pedal assembly, this is non-limiting. That is, the pedal assembly 10 may only include a single pedal (i.e., an accelerator pedal, a brake pedal, and/or a clutch pedal). Further, the pedal assembly 10 may include more than two pedals (i.e., an accelerator pedal, a brake pedal, and a clutch pedal).

The upper housing 16 and/or lower housing 18 are coupled to at least one vehicle component 17 of a vehicle, such as an IP bracket, a firewall, and the like, as appreciated by those skilled in the art. It should be appreciated that the upper housing 16 is positioned above the lower housing 18 in the pedal assembly vertical direction (i.e. in the +/−Z direction). As such, the upper housing 16 may be coupled to the at least one vehicle component 17 while the lower housing 18 is coupled to another vehicle component. Further, the upper and lower housings 16, 18 may be coupled to one another. The upper and lower housing 16, 18 may be formed of a single component, such as a monolithic structure, or formed of multiple components. The upper and lower housings 16, 18 may be coupled together by welding, bolts, or any other known method. Further, the pedal assembly 10 may be configured for any type of vehicle, such as an automobile, a plane, a boat, and/or the like.

Referring to FIGS. 1-2, 4-5, 8-9, and 11-12, the upper housing 16 includes an upper user facing surface 20 and an opposite vehicle facing surface 22. The upper user facing surface 20 faces a user positioned in a vehicle, such as a driver positioned in the driver seat of the vehicle, while the vehicle facing surface 22 abuts and/or connects to the at least one vehicle component 17 such as a firewall or other components of the vehicle. The upper housing 16 includes a first projection 47 that extends from the upper user facing surface 20 of the upper housing 16 in the pedal assembly longitudinal direction (i.e., in the +/−X direction) in a direction that is opposite of the vehicle facing surface 22. The first projection 47 includes a top wall 26, a pair of opposing sidewalls 28, and a forward wall 30.

The top wall 26 extends from the upper user facing surface 20 in the pedal assembly longitudinal direction (i.e., in the +/−X direction). The pair of opposing sidewalls 28 extend downwardly from opposite lateral edges 27 of the top wall 26 in the pedal assembly vertical direction (i.e., in the +/−Z direction). The forward wall 30 extends downwardly from a forward edge 31 of the top wall 26 in the pedal assembly vertical direction (i.e., in the +/−Z direction). As such, the forward wall 30 connects with the pair of opposing sidewalls 28 at an abutment 33. A pedal adjustment cavity 24 is formed within the first projection 47. That is, the top wall 26, the pair of opposing sidewalls 28, and the forward wall 30 form the pedal adjustment cavity 24, which is a generally hollow interior space within the first projection 47. In some embodiments, the vehicle facing surface 22 may form a rear wall of the pedal adjustment cavity 24. In other embodiments, the pedal adjustment cavity 24 is open to the rear.

In some embodiments, a bottom or lower portion of the pedal adjustment cavity 24 is open to allow for movement of a pedal arm 32, as discussed in greater detail herein. In other embodiments, a lower wall may be positioned to connect with the pair of opposing sidewalls 28, the forward wall 30, and the upper user facing surface 20 to enclose the pedal adjustment cavity 24. As such, in this embodiment, the lower wall includes a slot or opening to accommodate for the pedal arm 32 and movement thereof, as discussed in greater detail herein.

Still referring to FIGS. 1-2, 4-5, 8-9, and 11-12, the pair of opposing sidewalls 28 of the upper housing 16 include a first pair of elongated slots 46. The first pair of elongated slots 46 are spaced apart from one another. In some embodiments, each of the pair of elongated slots 46 extend linearly in the pedal assembly longitudinal direction (i.e., in the +/−X direction) between a first terminating portion 41*a* and second terminating portion 41*b*. In other embodiments, each of the first pair of elongated slots 46 are curvilinear. In some embodiments, the first pair of elongated slots 46 may be angled in orientation with respect to the top wall 26 in a direction from the upper user facing surface 20 downwardly towards the forward wall 30 in the pedal assembly longitudinal direction (i.e., in the +/−X direction). That is, the first terminating portion 41*a* of the first pair of elongated slots 46 is positioned above the second terminating portion 41*b* of the first pair of elongated slots 46 in the pedal assembly vertical direction (i.e., in the +/−Z direction) such that the first pair of elongated slots 46 are angled in orientation.

In other embodiments, each of the first pair of elongated slots 46 may extend at 90 degrees (i.e., linear without an angle) in orientation with respect to the top wall 26 in a direction away from the upper user facing surface 20 towards the forward wall 30 in the pedal assembly longitudinal direction (i.e., in the +/−X direction). That is, the first terminating portion 41*a* and the second terminating portion 41*b* of the first pair of elongated slots 46 are equally positioned in the pedal assembly vertical direction (i.e., in the +/−Z direction) such that the first pair of elongated slots 46 are horizontal or linear in orientation in the pedal assembly longitudinal direction (i.e., in the +/−X direction). Each of the first pair of elongated slots 46 are configured to receive a first axle 40 of the pedal assembly 14, as discussed in greater detail herein.

In some embodiments, the first projection 47 is integrally formed with the upper housing 16. That is, the first projection 47 and the upper housing 16 are monolithic structures. In other embodiments, the first projection 47 may be coupled to the upper housing 16 by welding, bolts, or any other known method.

Figure 2:
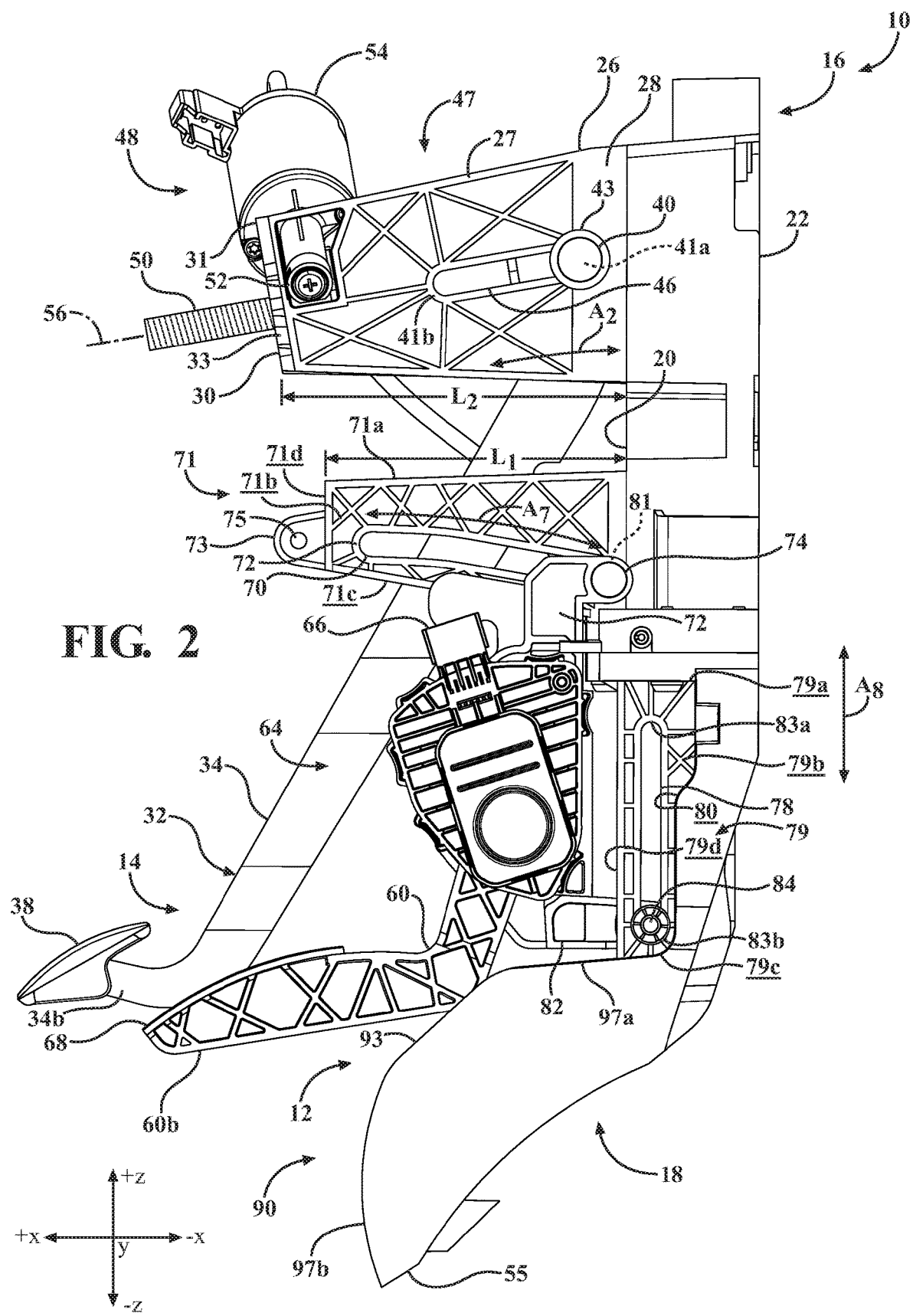
FIG. 2 schematically depicts a side view of the pedal assembly of FIG. 1 according to one or more embodiments shown and described herein.

The upper housing 16 further includes a second projection 71 that extends from the upper user facing surface 20 in the pedal assembly longitudinal direction (i.e., in the +/−X direction) in the direction opposite of the vehicle facing surface 22. The second projection 71 includes a top surface 71*a* that extends from the upper user facing surface 20, an opposite bottom surface 71*c*, and a pair of side surfaces 71*b* that extend between the top surface 71*a* and the bottom surface 71*c* and all terminate at a front surface 71*d*. The front surface 71*d* faces the user. That is, the front surface 71*d* is a planar surface that extends in the same direction as the upper user facing surface 20, but the front surface 71*d* is disposed at terminating portion of the second projection 71. As such, the second projection 71 extends a length L2 from the upper user facing surface 20 in the pedal assembly longitudinal direction (i.e., in the +/−X direction) and terminates at the front surface 71*d*, as best show in FIG. 2. The length L2 of the second projection 71 is less than a length L1 that the first projection 47 extends from the upper user facing surface 20, as best seen in FIG. 2.

In some embodiments, a protrusion 73 extends from the front surface 71*d* in the pedal assembly longitudinal direction (i.e., in the +/−X direction). In some embodiments, the protrusion 73 may generally be a "U shape". In other embodiments, the protrusion 73 may be other shapes such as a square, rectangle, triangle, hexagon, and the like. Further, in some embodiments, the protrusion 73 includes an aperture 75. The aperture 75 may be configured to receive a fastener such as a bolt and nut, a screw, a rivet, a j-shaped hook, and/or the like, and may be used to assist in connecting the upper housing 16 to the at least one vehicle component 17 of the vehicle. For example, to the IP bracket, the firewall, and the like, or to have a harness or other vehicle component attach to the aperture 75.

Still referring to FIGS. 1-2, 4-5, 8-9, and 11-12, the pair of side surfaces 71*b* of the second projection 71 includes a second elongated slot 70. The second elongated slot 70 may be arcuate or curvilinear and may curve in the pedal assembly vertical direction (i.e., in the +/−Z direction). That is, a second terminating portion 77 of the second elongated slot 70 may be above a first terminating portion 81 of the second elongated slot 70 in the pedal assembly vertical direction (i.e., in the +/−Z direction). In some embodiments, the second elongated slot 70 extends in the pedal assembly longitudinal direction (i.e., in the +/−X direction) a length greater than the length that the first pair of elongated slots 46 extend in the pedal assembly longitudinal direction (i.e., in the +/−X direction).

In other embodiments, the second elongated slot 70 extends horizontally or linearly in the pedal assembly longitudinal direction (i.e., in the +/−X direction). In other embodiments, the second elongated slot 70 may be angled with respect to the top surface 71*a* in a direction from the upper user facing surface 20 downwardly towards the front surface 71*d* in the pedal assembly longitudinal direction (i.e., in the +/−X direction). In other embodiments, the second elongated slot 70 may extend at 90 degrees (i.e., linear without an angle) with respect to the top surface 71*a* in a direction from the upper user facing surface 20 upwardly or downwardly in the pedal assembly vertical direction (i.e., in the +/−Z direction) and towards the front surface 71*d* in the pedal assembly longitudinal direction (i.e., in the +/−X direction). The second elongated slot 70 is configured to receive a second axle 74 of the accelerator pedal assembly 12, as discussed in greater detail herein.

It should also be appreciated that the first pair of elongated slots 46 and the second elongated slot 70 extend in the pedal assembly longitudinal direction (i.e., in the +/−X direction) a length required to assist in allowing both the accelerator pedal assembly 12 and the pedal assembly 14 to move between a use position and a stowed position where in the stowed position, access to the accelerator pedal assembly 12 and the pedal assembly 14 for actuation is prohibited, as discussed in greater detail herein.

In some embodiments, the upper housing 16 and the first and second projections 47, 71 are made up of a plastic, such as polyether ether ketone, polycarbonate, polystene, polypropylene, and the like. In other embodiments, the upper housing 16 and the first and second projections 47, 71 are made up of a metal, such as aluminum, steel, magnesium, and the like. In further embodiments, the upper housing 16 and first and second projections 47, 71 consist of a combination of materials, including plastic and metal. For example, the upper housing 16 may be made of a plastic and the first and second projections 47, 71 are made of a metal, where the projections may be joined to the upper housing 16 by fasteners or chemical attachment.

In some embodiments, the first and second projections 47, 71 are monolithic structures with the upper housing 16. That is, the first and second projections 47, 71 are formed as a unitary or integral construction with the upper housing 16. In other embodiments, the first projection 47 or the second projection 71 is monolithic structure formed with the upper housing 16 while either the first projection 47 or the second projection 71 is joined to the upper housing 16. For example, either the first projection 47 or the second projection 71 may be plastic welded to the upper housing 16, connected by a fastener, such as a bolt and nut, a screw, a rivet, and the like, may be chemically attached via an adhesive and/or an epoxy, and the like. In other embodiments, both the first projection 47 and the second projection 71 are separate components that are joined with the upper housing 16. For instance, each or both of the first projection 47 and the second projection 71 may be joined to the upper housing 16 via plastic welded to the upper housing, connected by a fastener, such as a bolt and nut, a screw, a rivet, and the like, may be chemically attached via an adhesive or epoxy, and the like.

Now referring to FIGS. 1-5 and 8-12, the lower housing 18 includes an upper surface 93 and at least one receiving cavity 90 positioned below the upper surface 93 in the pedal assembly vertical direction (i.e., in the +/−Z direction). Further, the upper surface 93 may be angled and follow the contour of the of the lower housing 18 such that an upper portion 97a of the upper surface 93 is positioned above a lower portion 97b of the upper surface 93 and such that the upper surface 93 is positioned closer to the upper user facing surface 20. Further, the lower portion 97b may terminate at different heights from a bottom surface 55 of the lower housing 18 in the pedal assembly vertical direction (i.e., in the +/−Z direction). The at least one receiving cavity 90 is configured to receive at least a portion of the pedal assembly 14 and the accelerator pedal assembly 12 when the pedal assembly 10 is in the stowed position, as discussed in greater detail herein.

While the lower housing 18 is depicted with the at least one receiving cavity 90 as a pair of receiving cavities 90, this is non-limiting. That is, the lower housing 18 may only include a single cavity to accommodate a single pedal, a pair of cavities to accommodate two pedals, three cavities to accommodate three pedals, and so on. For example, the pedal assembly 10 may include a brake pedal, an accelerator pedal, and a clutch pedal and three separate at least one receiving cavities. Further, in some embodiments, a single cavity may receive more than one pedal (i.e., a brake pedal and an accelerator pedal).

As illustrated, one of the at least one receiving cavity 90 corresponds to the pedal assembly 14, while the other one of the at least one receiving cavity 90 corresponds to the accelerator pedal assembly 12. In some embodiments, an interior surface 92a of the at least one receiving cavity 90 that corresponds to the pedal assembly 14 is angled with respect to the upper surface 93 of the lower housing 18. Further, in some embodiments, the interior surface 92a of the at least one receiving cavity 90 that corresponds to the pedal assembly 14 includes a plurality of contoured sections 94. The plurality of contoured sections 94 may be shaped to match the curves, angles, bends and the like of a pedal pad 38 and a pedal arm 32 of the pedal assembly 14, as discussed in greater detail herein.

Further, the at least one receiving cavity 90 that corresponds to the accelerator pedal assembly 12 includes an interior surface 92b. The at least one receiving cavity 90 that corresponds to the accelerator pedal assembly 12 is angled with respect to the upper surface 93 of the lower housing 18.

In some embodiments, the interior surface 92b of the at least one receiving cavity 90 that corresponds to the accelerator pedal assembly 12 is angled without contours. In other embodiments, the interior surface 92b of the at least one receiving cavity 90 that corresponds to the accelerator pedal assembly 12 includes contours. It should be appreciated that the at least one receiving cavity 90 has a depth in the pedal assembly vertical direction (i.e., in the +/−Z direction) from either the upper surface 93 of the lower housing 18 and/or from a floorboard surface 101 of a floorboard 100 of the vehicle to allow each of at least a portion of the pedal pad 38 and the pedal arm 32 of the pedal assembly 14 and at least a portion of an accelerator pedal pad 68 and the elongated main portion 60 of the accelerator pedal assembly 12 to be retracted or moved below the floorboard surface 101 in the pedal assembly vertical direction (i.e., in the +/−Z direction) and into the corresponding at least one receiving cavity 90 in the stowed positon, as best shown in FIGS. 8-12, and as discussed in greater detail herein. As such, the driver of the vehicle cannot actuate or move either the accelerator pedal assembly 12 and/or the pedal assembly 14 when in the stowed position. As such, the pedal assembly 10 is disabled or prohibited from human use when in the stowed positon.

Now referring back to FIGS. 1-2, 4-5, 8-9, and 11-12, in some embodiments, the lower housing 18 further includes a pair of third projections 79 that are spaced apart in the pedal assembly lateral direction (i.e., in the +/−Y direction) and each extend along a lower user facing surface 80 of the lower housing 18 in the pedal assembly vertical direction (i.e., in the +/−Z direction). As the pair of third projections 79 are identical, only one of the third projections 79 will be described in detail.

The third projection 79 extends outwardly from the lower user facing surface 80 in the pedal assembly longitudinal direction (i.e., in the +/−X direction) in the direction opposite of the vehicle facing surface 22. The third projection 79 includes a top surface 79a that extends from one of the lower user facing surface 80, an opposite bottom surface 79c, and a pair of side surfaces 79b that extend between the top surface 79a and the bottom surface 79c and all terminate at a front surface 79d. The front surface 79d faces the user. That is, the front surface 79d is a planar surface that extends in the same direction as the lower user facing surface 80, but the front surface 79d is disposed at terminating portion of the second projection 71. In some embodiments, the top surface 79a extends from the lower user facing surface 80 a distance shorter than a length of the pair of side surfaces 79b such that the third projection 79 is generally rectangle shape. In other embodiments, the third projection 79 may be shape, such as a square, triangle, octagon, and the like, and may be any regular or irregular shape.

Still referring to FIGS. 1-2, 4-5, 8-9, and 11-12, the pair of side surfaces 79b of the third projection 79 includes a third pair of elongated slots 78. In some embodiments, the third pair of elongated slots 78 is oriented generally in the pedal assembly vertical direction (i.e., in the +/−Z direction). That is, the second terminating portion 83a of the third pair of elongated slots 78 may be above the first terminating portion 83b of the third pair of elongated slots 78 in the pedal assembly vertical direction (i.e., in the +/−Z direction).

In other embodiments, the third pair of elongated slots 78 may be angled with respect to the top surface 79a in a direction from the lower user facing surface 80 downwardly towards the front surface 71d in the pedal assembly longitudinal direction (i.e., in the +/−X direction) and/or in the opposite direction. In other embodiments, the third pair of elongated slots 78 may extend in an arcuate or curvilinear orientation with respect to the top surface 79a. The third pair of elongated slots 78 is configured to receive a third axle 84 of the accelerator pedal assembly 12, as discussed in greater detail herein.

It should also be appreciated that the first pair of elongated slots 46, the second elongated slot 70, and the third pair of elongated slots 78 are orientated and have a length required to assist in allowing both the accelerator pedal assembly 12 and the pedal assembly 14 to move between the use position and the stowed position such that the access to the accelerator pedal assembly 12 and the pedal assembly 14 for actuation is prohibited in the stowed position, as discussed in greater detail herein.

In some embodiments, the lower housing 18 and the third projection 79 includes a plastic material, such as polyether ether ketone, polycarbonate, polystene, polypropylene, and the like. In other embodiments, the lower housing 18 and the third projection 79 are made from a metal material, such as aluminum, steel, magnesium, and the like. In further embodiments, the lower housing 18 and the third projection 79 consist of a combination of materials, including plastic and metal. For example, the lower housing 18 may be made of a plastic and the pair of third projections 79 are made of a metal, where the projection may be joined to the lower housing 18 by fasteners or chemical attachment.

In some embodiments, the third projection 79 is formed with the lower housing 18. That is, the third projection 79 may be formed as a unitary construction or a monolithic structure with the lower housing 18. In other embodiments, the third projection 79 may be coupled to the lower housing 18 by welding, such as plastic welding, by fasteners such as bolts, screws, rivets, and the like, by an adhesive such as epoxy, and/or the like. In other embodiments, the third projection 79 extends from both the upper user facing surface 20 of the upper housing 16 and the lower user facing surface 80 of the lower housing 18. That is the third projection 79 traverses both the upper user facing surface 20 of the upper housing 16 and the lower user facing surface 80 of the lower housing 18.

Figure 3:
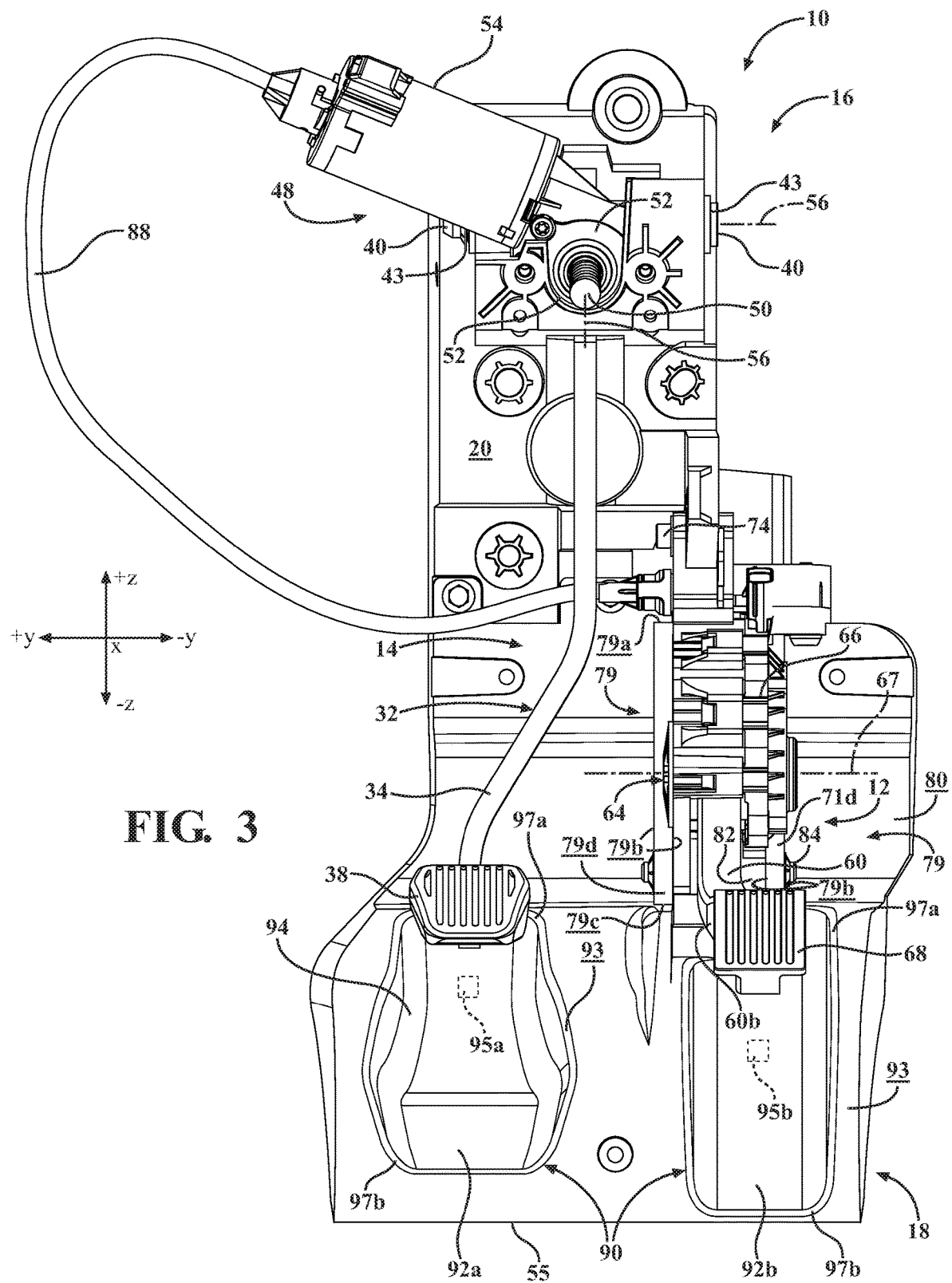
FIG. 3 schematically depicts a front view of the pedal assembly of FIG. 1 according to one or more embodiments shown and described herein.
Figure 4:
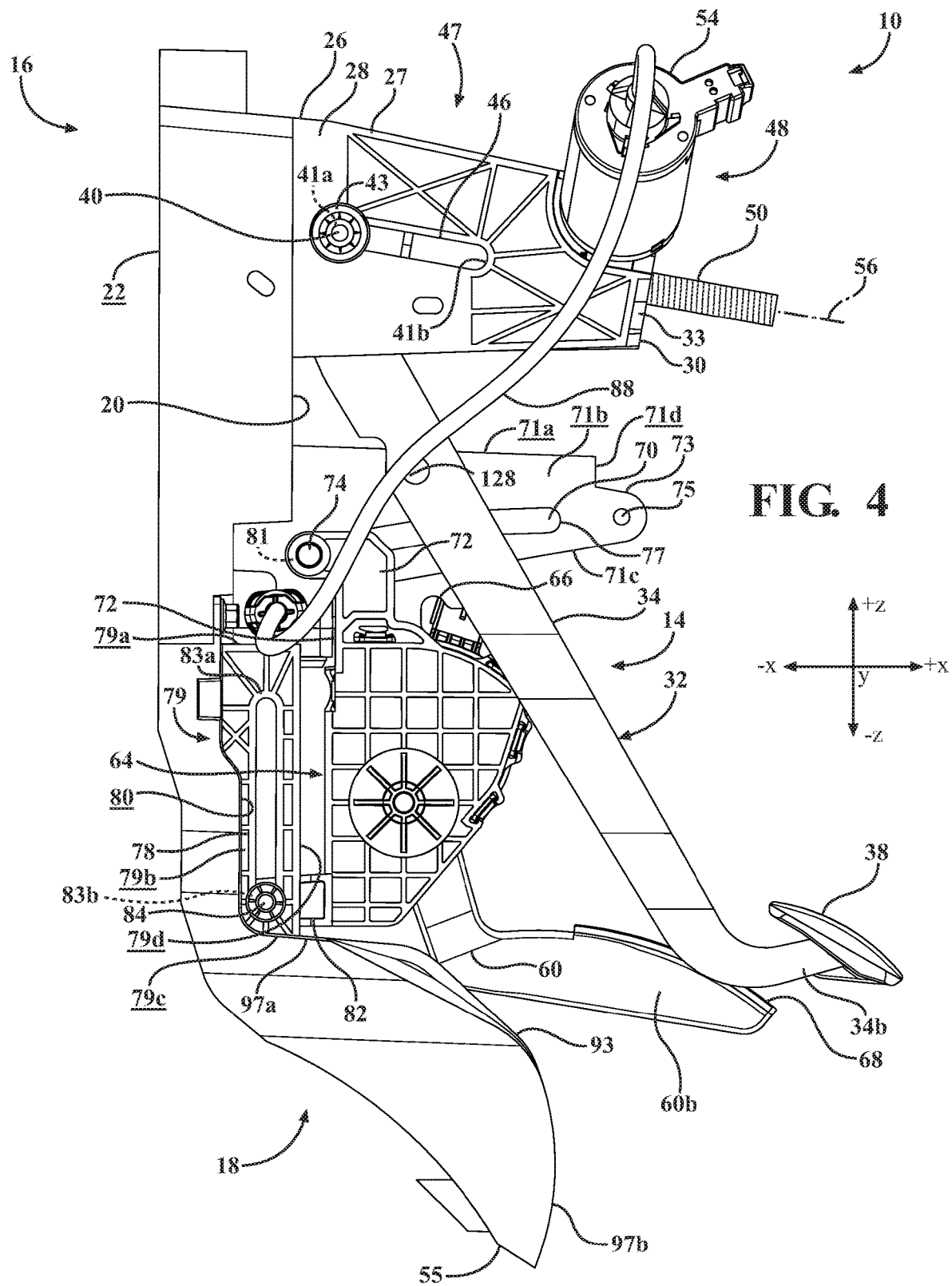
FIG. 4 schematically depicts a side view of the pedal assembly of FIG. 1 according to one or more embodiments shown and described herein.

Referring back to FIG. 1 and now to FIG. 3, in some embodiments, the interior surfaces 92a, 92b of the at least one receiving cavity 90 each includes at least one position sensor 95a, 95b. In some embodiments, the at least one position sensor 95a is configured to determine or detect a presence and/or absence of the pedal pad 38 and the pedal arm 32 of the pedal assembly 14 within the at least one receiving cavity 90. Further, in some embodiments, the at least one position sensor 95b is configured to determine or detect a presence and/or absence of the accelerator pedal pad 68 and the elongated main portion 60 of the accelerator pedal assembly 12 within the at least one receiving cavity 90. It should be appreciated that the at least one position sensor 95a, 95b may be a laser switch, a proximately switch, a pressure switch and/or the like. In some embodiments, the at least one position sensor 95a, 95b is communicatively coupled with an electronic control unit (ECU) of the vehicle that is configured to detect the outputs of the at least one position sensor 95a, 95b. In some embodiments, when the ECU detects that the pedal assembly 14 and/or the accelerator pedal assembly 12 are in the stowed position (i.e., within the at least receiving cavity 90), then functionalities of the pedal assembly 14 and/or the accelerator pedal assembly 12 are disabled by the ECU.

In other embodiments, the position of the axle within the elongated slots may be detect by the at least one position sensor 95a, 95b to determine the position of the accelerator pedal assembly 12 and/or the pedal assembly 14. For example, the at least one position sensor 95a, 95b may be positioned within the first pair of elongated slots 46 to determine the position of the first axle 40. In other embodiments, the at least one position sensor 95a, 95b may be positioned at the first terminating portion 41a and the second terminating portion 41b of the first pair of elongated slots 46 to determine the position of the first axle 40. In yet another example, the at least one position sensor 95a, 95b may be positioned within the second elongated slot 70 at the first terminating portion 81 and the second terminating portion 77 to determine the position of the second axle 74. In yet another example, the at least one position sensor 95a, 95b may be positioned within the third elongated slot 78 at the first terminating portion 83a and the second terminating portion 83b to determine the position of the third axle 84.

In other embodiments, the position or number of revolutions of an actuator 54 may be detected by the at least one position sensor 95a, 95b to determine the position of the accelerator pedal assembly 12 and/or the pedal assembly 14. For example, the at least one position sensor 95a, 95b may be positioned so to detect the number of revolutions of the actuator 54 so to know whether the accelerator pedal assembly 12 and/or the pedal assembly 14 are in the stowed or use position.

It should be appreciated that in any embodiment, the at least one position sensor 95a, 95b may be a laser switch, a proximately switch, a pressure switch and/or the like. In some embodiments, the at least one position sensor 95a, 95b is communicatively coupled with the electronic control unit (ECU) of the vehicle that is configured to detect the outputs of the at least one position sensor 95a, 95b. In some embodiments, when the ECU detects that the pedal assembly 14 and/or the accelerator pedal assembly 12 are in the stowed position (i.e., within the at least receiving cavity 90), then functionalities of the pedal assembly 14 and/or the accelerator pedal assembly 12 are disabled by the ECU.

Figure 5:
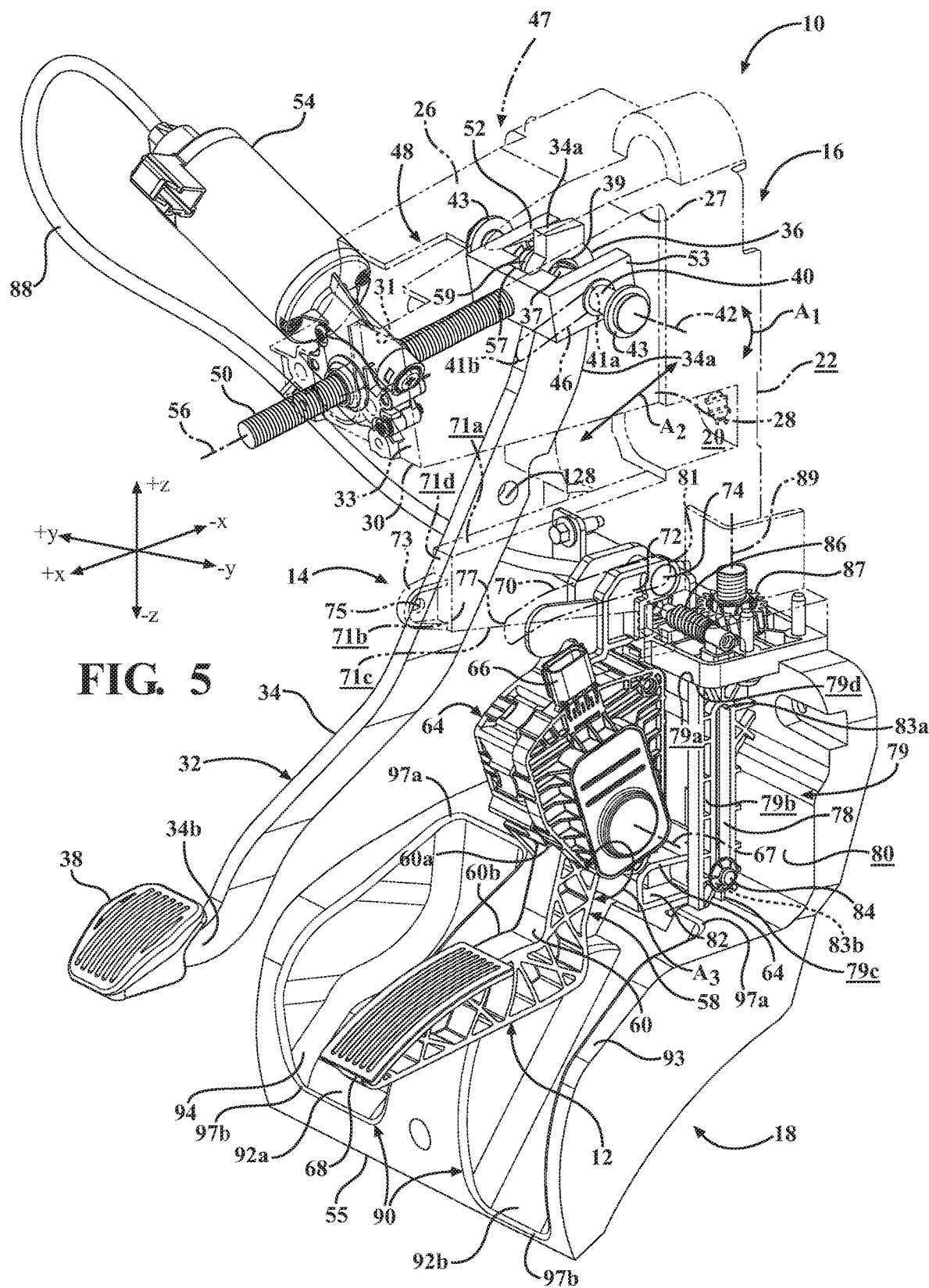
FIG. 5 schematically depicts a perspective view of the pedal assembly of FIG. 1 with an upper housing illustrated in phantom according to one or more embodiments shown and described herein.
Figure 6:
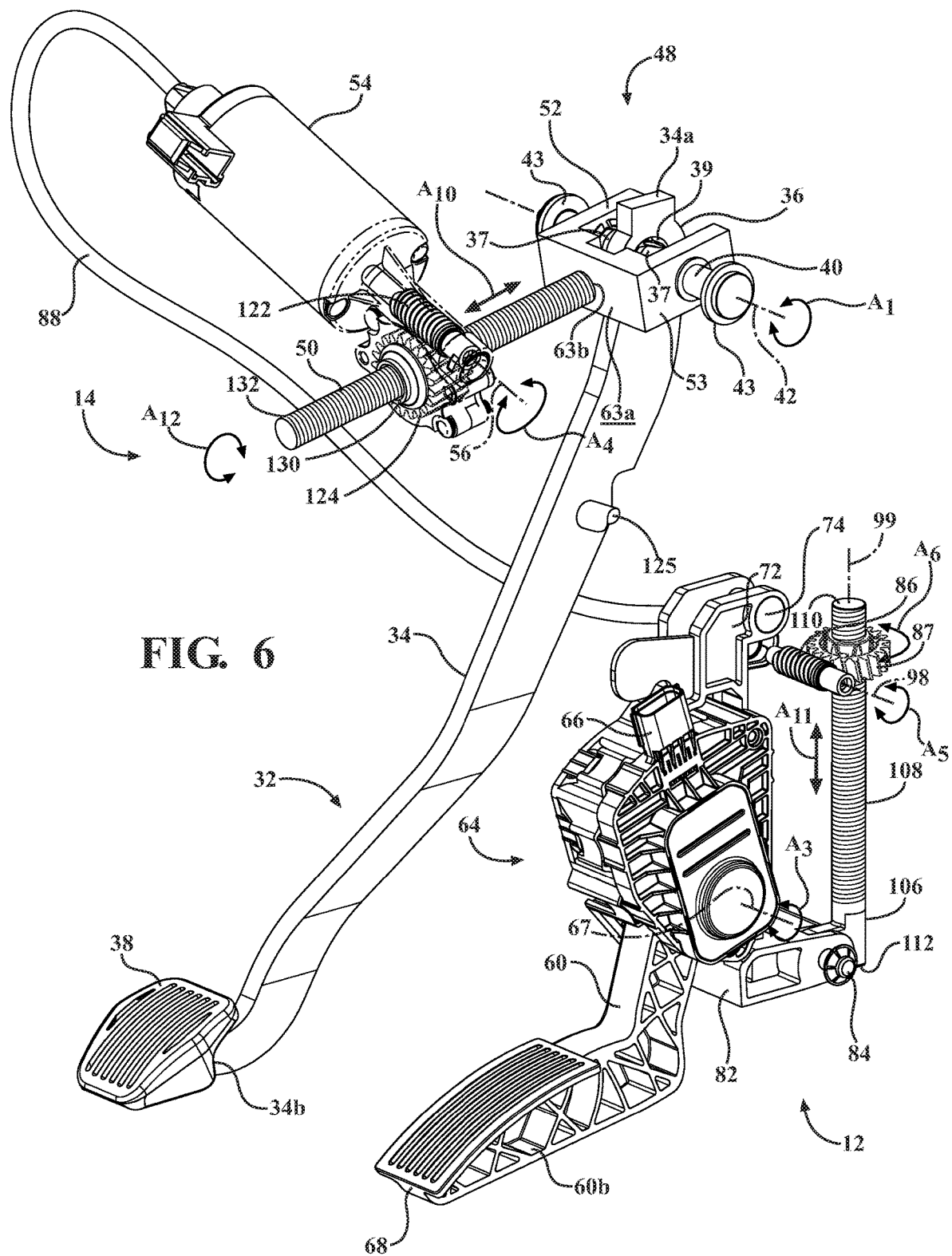
FIG. 6 schematically depicts a partial perspective view of a pedal assembly and an accelerator pedal assembly of the pedal assembly of FIG. 1 according to one or more embodiments shown and described herein.
Figure 7:
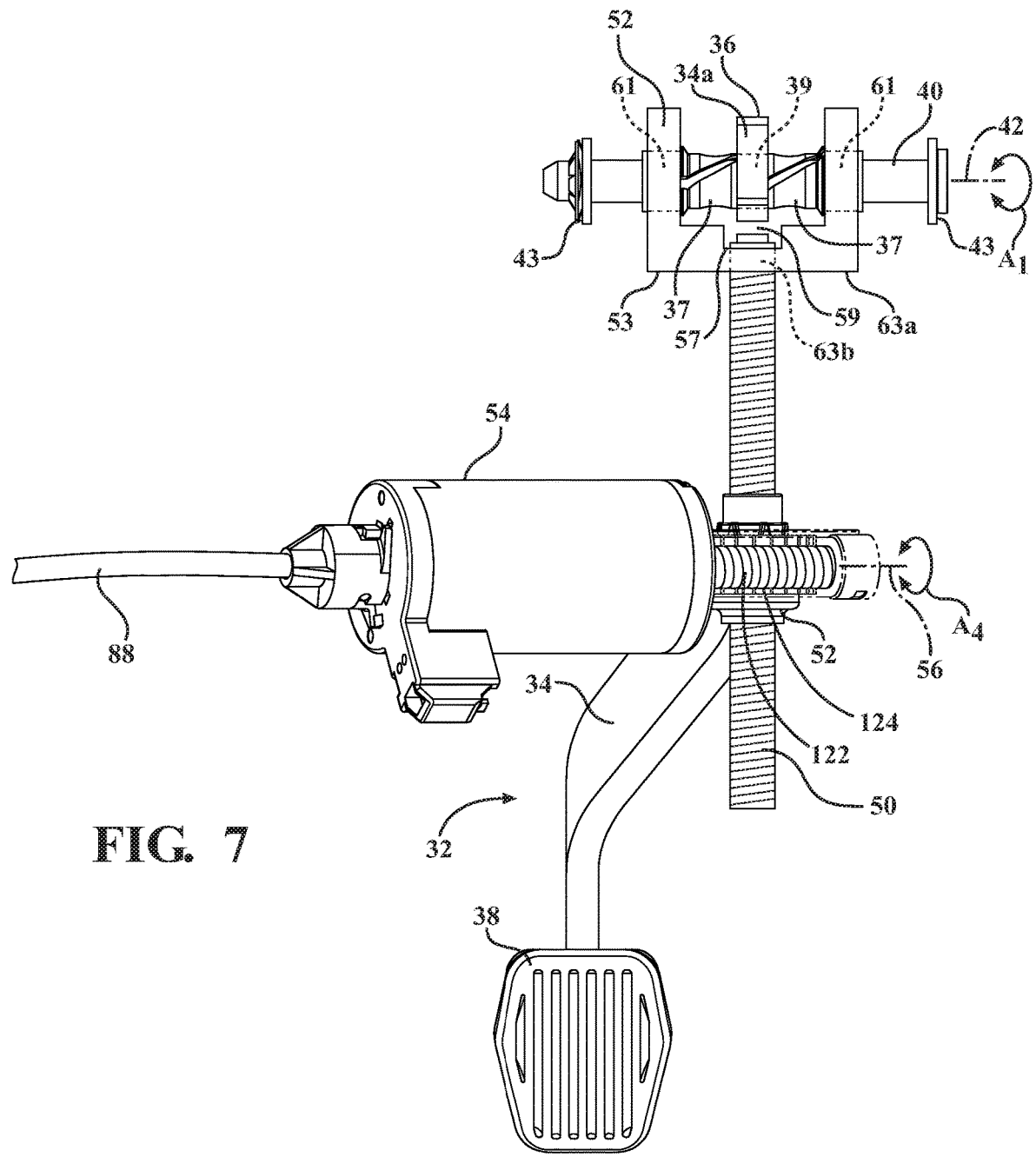
FIG. 7 schematically depicts a top down view of the pedal assembly of the pedal assembly of FIG. 6 according to one or more embodiments shown and described herein.
Figure 8:
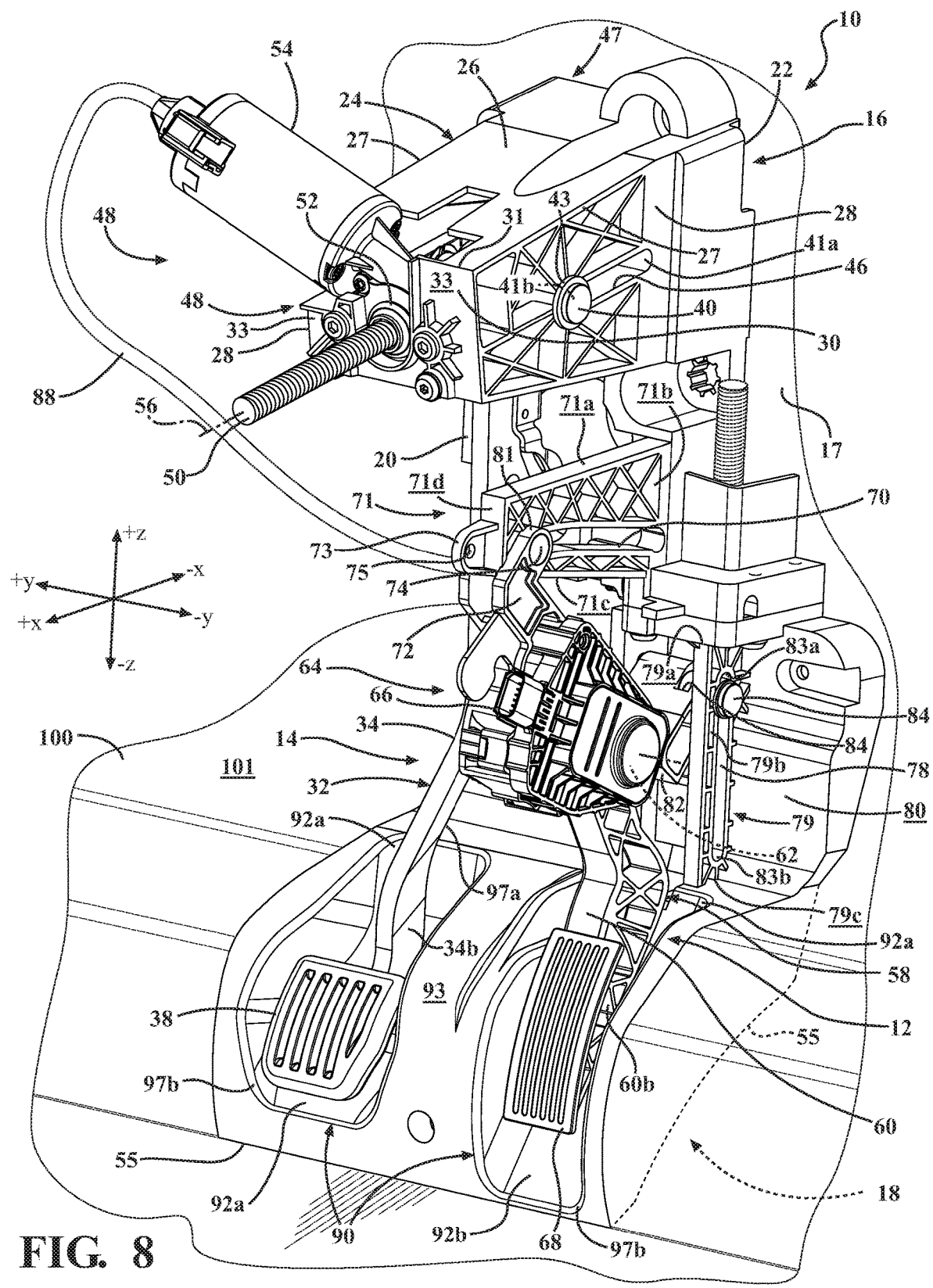
FIG. 8 schematically depicts a perspective view of the pedal assembly of FIG. 1 in a stowed position according to one or more embodiments shown and described herein.
Figure 9:
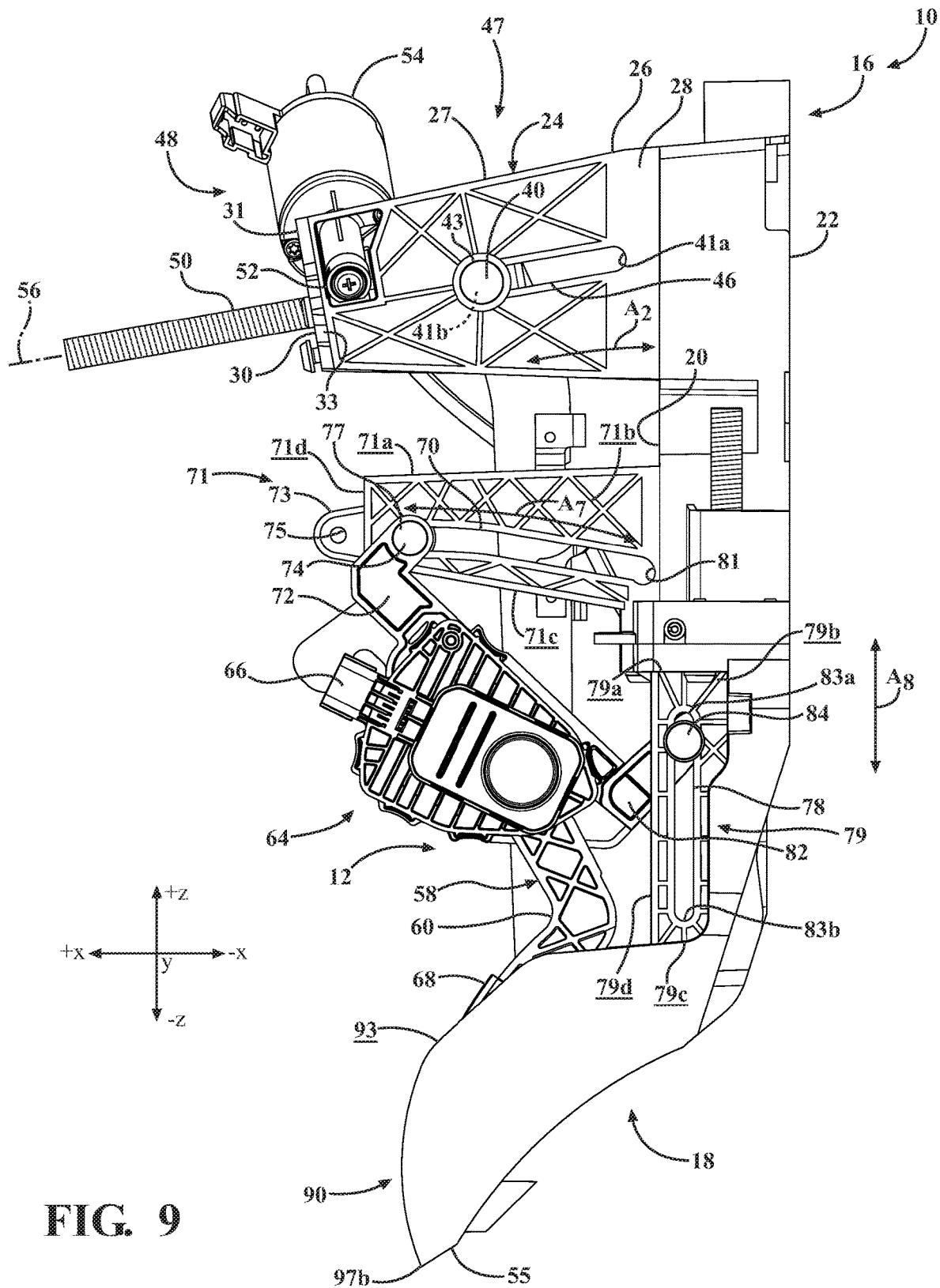
FIG. 9 schematically depicts a side view of the pedal assembly of FIG. 8 according to one or more embodiments shown and described herein.
Figure 10:
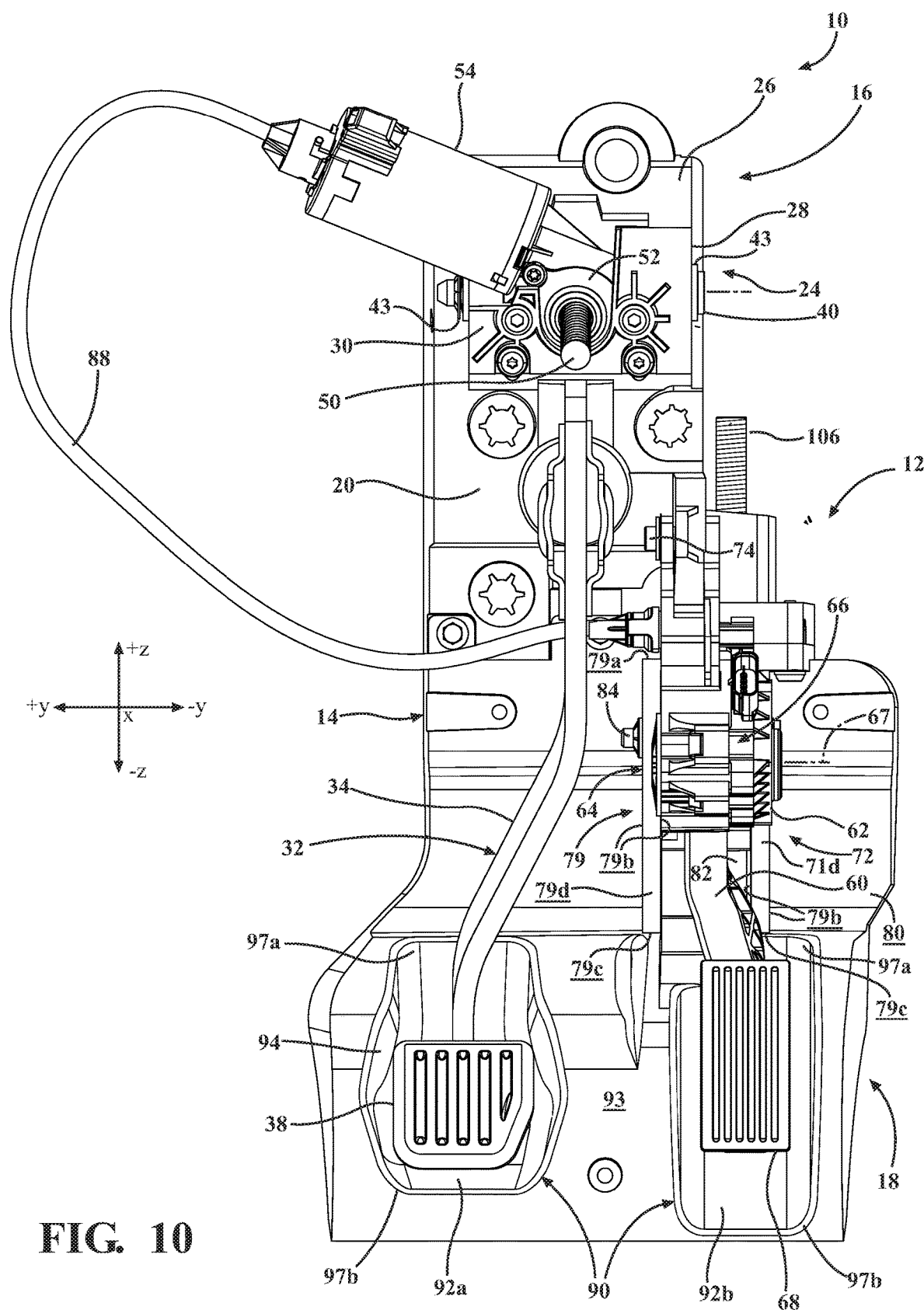
FIG. 10 schematically depicts a front view of the pedal assembly of FIG. 8 according to one or more embodiments shown and described herein.
Figure 11:
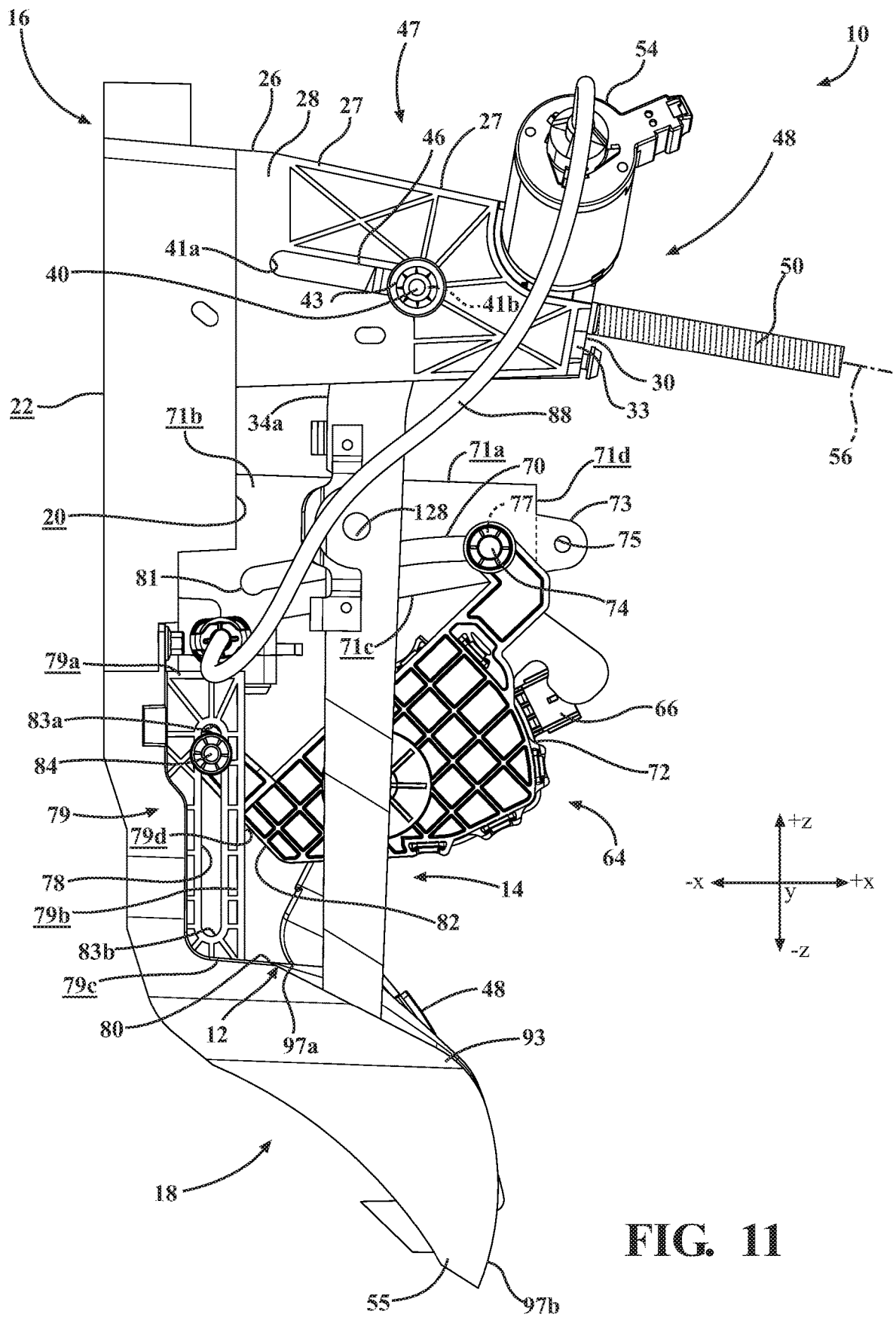
FIG. 11 schematically depicts a side view opposite the side view of the pedal assembly of FIG. 7 according to one or more embodiments shown and described herein.
Figure 12:
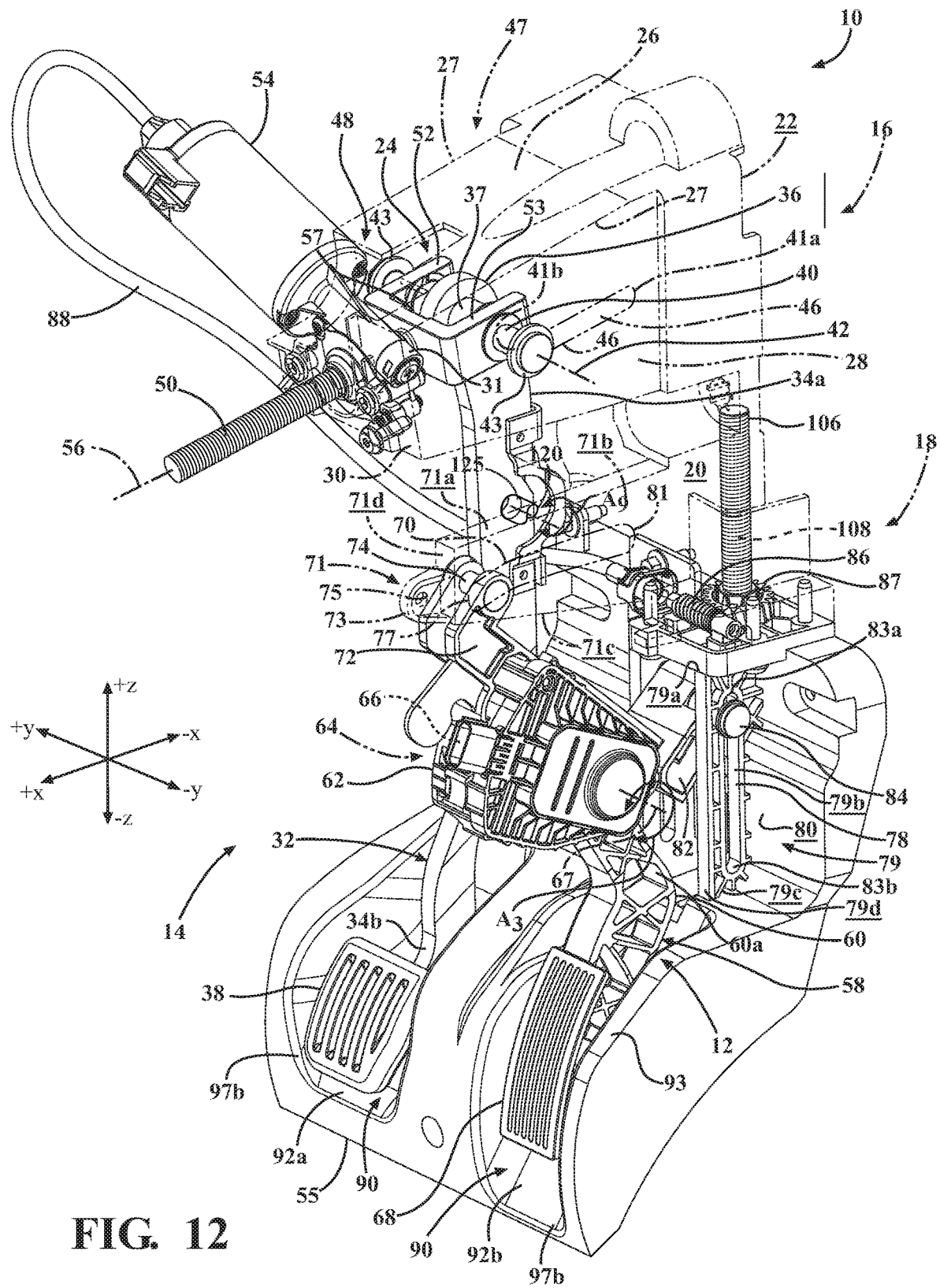
FIG. 12 schematically depicts the perspective view of the pedal assembly of FIG. 8 with an upper housing illustrated in phantom according to one or more embodiments shown and described herein.
Figure 13:
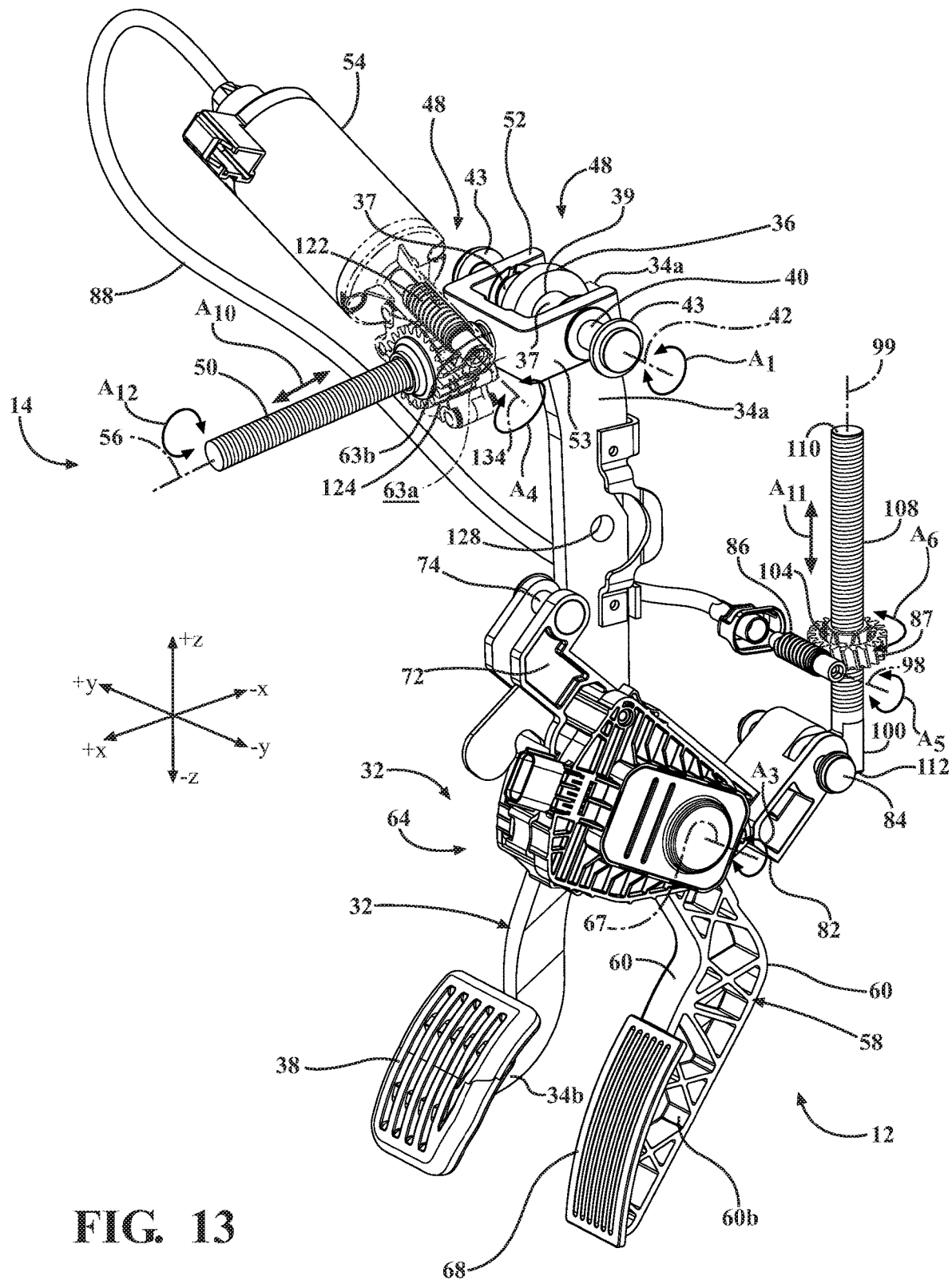
FIG. 13 schematically depicts a partial perspective view of a pedal assembly and an accelerator pedal assembly of the pedal assembly of FIG. 8 according to one or more embodiments shown and described herein.
Figure 14:
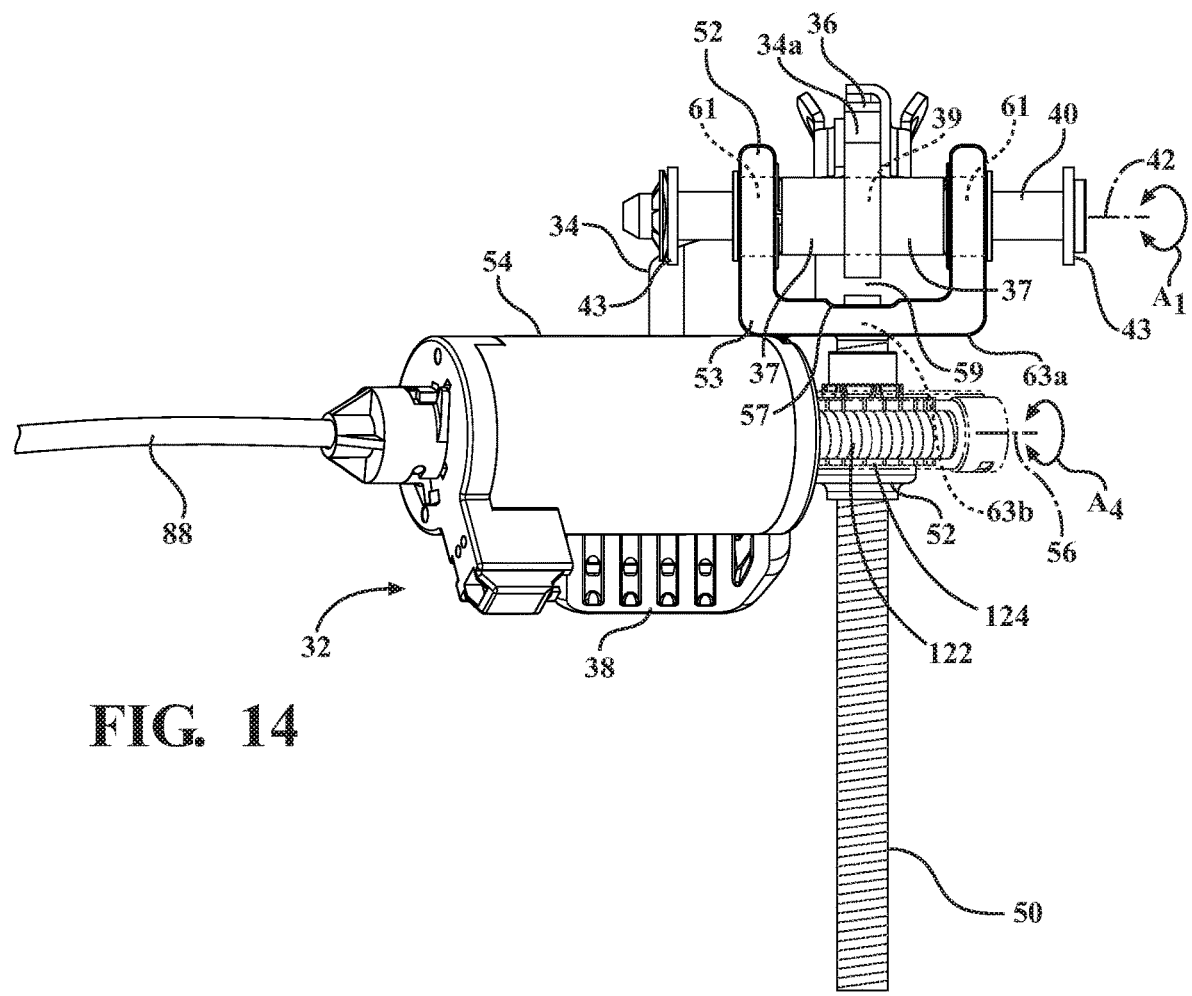
FIG. 14 schematically depicts a top down view of the pedal assembly of the pedal assembly of FIG. 8 according to one or more embodiments shown and described herein.

Referring back to FIGS. 1-5 and now to FIGS. 6-7, the pedal assembly 14 includes the pedal arm 32 and an elongated rod 125. The elongated rod 125 may be a booster input rod. The pedal arm 32 includes an elongated main portion 34, a first bore 128, a pivot portion 36 positioned adjacent to an upper end portion 34a of the elongated main portion 34. The pivot portion 36 includes a second bore 39. The pedal pad 38 is positioned at an opposite lower end portion 34b of the elongated main portion 34. The second bore 39 of the pivot portion 36 receives the first axle 40. The first bore 128 is positioned between the upper end portion 34a and the lower end portion 34b and is configured to receive at least a portion of the elongated rod 125.

The first axle 40 may be an elongated member such as a pivot pin with a pair of flanges 43 or cap portions positioned at each end of the elongated member and each pair of flanges 43 have a larger diameter than the first axle 40. Further, one of the pair of flanges 43 or end of the first axle 40 may include a locking device such as a c-clip, and e-clip and the like that fits within a groove or channel of the first axle 40.

The pedal assembly 14 further includes a bushing 37 and a bracket 53. The bracket may be generally a U-shape, although this is not limiting and may include a plurality of different shapes such as a V shape, a square shape, a rectangular shape, and the like. The bracket 53 includes a recess portion 57 at a front surface 63a that provides for a gap 59 between the bracket 53 and the upper end portion 34a of the pedal arm 32. The bracket 53 further includes a pair of bores 61 that extend in the pedal assembly lateral direction (i.e., in the +/−Y direction) and a bore 63b that extends through the front surface 63a. The pair of bores 61 receive the bushing 37 and the first axle 40 within the bushing 37. As such, the pair of bores 61, the bushing 37 and the first axle 40 permit for movement of the pivot portion 36 about a pivot axis 42 and in the direction indicated by the arrow A1, as shown in FIGS. 5-6. That is, portions of the bushing 37 and the first axle extends through the pair of bores 61 support the elongated main portion 34 and permit the pivot portion 36 to move with respect to the bracket 53 such that the pedal pad 38 changes an orientation in the pedal assembly longitudinal direction (i.e., in the +/−X direction) and/or in the pedal assembly vertical direction (i.e., in the +/−Z direction).

The first axle 40 forms the first pivot axis 42 which extends in the pedal assembly lateral direction (i.e., in the +/−Y direction) for movement or rotation of the pedal arm 32 in the use position. That is, the pedal arm 32 pivots or rotates about the first axle 40 within the upper housing 16 in the direction of arrow A1 when in the use position. As such, the first axle 40 forms the first pivot axis 42 but is stationary within the first pair of elongated slots 46 upon a depression and removal of pressure from the pedal pad 38 during the use position. Additionally, the upper housing 16 directly supports the first axle 40 within the pair of elongated slots 46.

For example, the pedal pad 38 is adapted for depression by the driver to pivot the pedal arm 32 about the first pivot axis 42 when the bushing 37 of the first axle 40 rotates within the first pair of elongated slots 46 to obtain a desired control input to the system of the vehicle. It should also be appreciated that while the pedal pad 38 is formed separate and attached to the pedal arm 32, in some embodiments, the pedal pad 38 may be formed as a monolithic structure with the pedal arm 32. Referring now to FIGS. 8-14, in the stowed position, the first bore 128 positioned between the upper end portion 34a and the lower end portion 34b forms a stowed axis 120 in which the pedal arm 34 moves about the stowed axis 120 in the direction illustrated by the arrow A9, as discussed in greater detail herein.

Referring now to FIGS. 1-7, the upper end portion 34a and the pivot portion 36 are both positioned within the pedal adjustment cavity 24. The first axle 40 slides or moves within the first pair of elongated slots 46 in the pedal arm longitudinal direction (i.e., in the +/−X direction) in the direction of arrow A2, as shown in FIG. 5, to move the pedal arm 32 and pedal pad 38 between the use positon and the stowed position, as discussed in greater detail herein.

The accelerator pedal assembly 12 includes the accelerator arm 58 and an electronic throttle control (ETC) bracket 64. The accelerator arm 58 has an elongated main portion 60, a pivot portion 62 extending from an upper end 60a of the elongated main portion 60, and the accelerator pedal pad 68 positioned at a bottom end 60b of the elongated main portion 60. The accelerator pedal assembly 12 further includes an ETC module 66. The pivot portion 62 generally extends from below the upper end 60a of the elongated main portion 60 in the pedal assembly vertical direction (i.e., in the +/−Z direction) and is positioned within to extend between the ETC bracket 64 and the ETC module 66, as discussed in greater detail herein.

The upper end 60a is connected to the control device by the ETC module 66 for electronic actuation. The ETC module 66 senses a pivotable movement of the accelerator arm 58 and sends electronic signals regarding such via an electric cable or wire connected thereto. The ETC module 66 may be of any suitable type known in the art. It should also be appreciated that while the accelerator pedal pad 68 is formed separate and attached to the accelerator arm 58, in embodiments, the accelerator pedal pad 68 may be formed as a monolithic structure with the accelerator arm 58.

Further, the ETC bracket 64 includes an upper portion 72 and a lower portion 82. The connection between the upper portion 72 of the ETC bracket 64 to a second axle 74 and the lower portion 82 of the ETC bracket 64 to a third axle 84 assists in preventing the ETC bracket 64 from rotating when the accelerator pedal pad 68 is depressed and/or released. The upper end 60a is operatively connected to a control device, such as a vehicle throttle. As such, pivotal movement of pivot portion 62, which is caused from a direct force or a release of force applied to the bottom end 60b and the accelerator pedal pad 68, pivots the upper end 60a about the pivot axis 67 in the direction of arrow A3, which operates the control device in a desired manner.

Further, the second elongated slot 70 within the second projection 71 is configured to engage with the upper portion 72 of an ETC bracket 64 of the accelerator pedal assembly 12 via the second axle 74. The second axle 74 extends in the pedal assembly lateral direction (i.e., in the +/−Y direction) within the second elongated slot 70 such that the second elongated slot 70 is a guide for the accelerator arm 58 to move between the use and stowed positions, as discussed in greater detail herein. Further, the third pair of elongated slots 78 within the third projection 79 are configured to engage with the lower portion 82 of an ETC bracket 64 of the accelerator pedal assembly 12 via the third axle 84. The third axle 84 extends in the pedal assembly lateral direction (i.e., in the +/−Y direction) within the third pair of elongated slots 78 such that the third pair of elongated slots 78 are a guide for the accelerator arm 58 to move between the use and stowed positions, as discussed in greater detail herein.

In some embodiments, the second and third axles 74, 84 may be an elongated member such as a pivot pin with a pair of flanges or cap portions positioned at either or both ends of the elongated member and the flanges have a larger diameter than the second and third axles 74, 84 respectively. Further, one of the pair of flanges or end of the second and third axles 74, 84 may include a locking device such as a c-clip, and e-clip and the like that fits within a groove or channel of the second and third axles 74, 84, respectively.

Referring now to FIGS. 5-7 and 12-14, a first drive assembly 48 includes an actuator 54, such as an electric motor, a first threaded member 50, a third threaded member 122, such as a lead screw, and a gear 124 for moving the first threaded member 50 along an axis 56 in the direction of the arrow A10. Portions of the actuator 54, the first threaded member 50, the third threaded member 122, and the gear 124 may be positioned, at least partially, within the pedal adjustment cavity 24 of the upper housing 16. A support member 52 for the first threaded member 50 is provided in the forward wall 30 of the upper housing 16, which may be integrally formed in the upper housing 16. The first threaded member 50 is mounted to the bracket 53 through the bore 63b of the front surface 63a and is positioned into the recess portion 57 prior to the gap 59 so to extend in the pedal assembly longitudinal direction (i.e., in the +/−X direction).

The third threaded member 122 is an elongated member having a threaded portion adapted for cooperation with the gear 124 that has externally threaded portion such that the third threaded member 122 and the gear 124 form a worm gear. In some embodiments, the third threaded member 122 is connected to an output member, such as a shaft of the actuator 54, a second actuator, and the like. In some embodiments, suitable gearing may be provided between the actuator 54 and the third threaded member 122 as necessary depending on the requirements of the pedal assembly 10.

The gear 124 further includes an aperture 130 that receives the first threaded member 50. The first threaded member 50 may be positioned in the pedal assembly longitudinal direction (i.e., in the +/−X direction) which is perpendicular to the third threaded member 122 orientated in the pedal assembly lateral direction (i.e., in the +/−Y direction). The first threaded member 50 includes a plurality of external threads 132. The third threaded member 122 rotates about the axis 134 in the direction as indicated by the arrow A4, which causes the first threaded member 50 to move along the axis 56 in the direction indicated by the arrow A10. In some embodiments, the gear 124 is molded of a suitable plastic material such as, for example, nylon. In other embodiments, the gear 124 is formed of metal such as, for example steel. In some embodiments, the first threaded member 50 and the third threaded member 122 are each formed of resin such as, for example, nylon. In other embodiments, the first threaded member 50 and the third threaded member 122 are formed of a metal such as, for example, steel.

In some embodiments, the actuator 54 is positioned within one of the pair of opposing sidewalls 28 that form the pedal adjustment cavity 24. In other embodiments, it should be appreciated that the actuator 54 may be positioned anywhere within the pedal assembly 10. The first threaded member 50 is connected to an output member, such as a shaft, of the actuator 54 in a known manner. In some embodiments, suitable gearing is provided between the actuator 54 and the first threaded member 50 as necessary depending on the requirements of the pedal assembly 10. Further, in some embodiments, suitable gearing is provided between the first threaded member 50 and the pivot portion 36 of the pedal arm 32 as necessary depending on the requirements of the pedal assembly 10. Moreover, it should be appreciated that the actuator 54 may alternatively be located at the accelerator pedal assembly 12 and/or each of the accelerator pedal assembly 12 and the pedal assembly 14 may have separate actuators. The actuator 54 may be connected to a suitable control circuit having operator input devices for selectively operating the actuator 54 to position the accelerator pedal assembly 12 and the pedal assembly 14 in either a plurality of positions within the use position, as best illustrated in FIGS. 1-5, or in the stowed position, as best illustrated in FIGS. 6-10, as discussed in greater detail herein.

Referring now to FIGS. 5 6, the first drive assembly 48 further includes a second threaded member 86, such as a lead screw and the like, which is connected to the actuator 54 via a flexible cable 88 or flexible rod in a known manner. It should be appreciated that the flexible cable 88 or flexible rod may be within a housing, a sheath, a cover, and/or the like. The second threaded member 86 is an elongated member having a threaded portion adapted for cooperation with a gear 87 that has externally threaded portion such that the second threaded member 86 and the gear 87 form a worm gear. In some embodiments, the second threaded member 86 is connected to a second output member, such as a shaft of the actuator 54, a second actuator, and the like. In some embodiments, suitable gearing may be provided between the actuator 54 and the second threaded member 86 as necessary depending on the requirements of the pedal assembly 10.

The gear 87 further includes an aperture 104 that receives a third threaded member 106. The third threaded member 106 may include a proximate end 110 and an opposite distal end 112. The distal end 112 may be an "L" shape with an opening to receive the third axle 84. That is, the third axle 84 connects or couples the lower portion 82 of the ETC bracket 64 to the distal end 112 of the third threaded member 106. The third threaded member 106 may be positioned in the pedal assembly vertical direction (i.e., in the +/−Z direction) which is perpendicular to the second threaded member 86 orientated in the pedal assembly lateral direction (i.e., in the +/−Y direction). The third threaded member 106 includes a plurality of external threads 108. The aperture 104 of the gear 87 includes a plurality of internal threads that complement the plurality of external threads 108 of the third threaded member 106. The second threaded member 86 rotates about a second rotation axis 98 in the direction as indicated by the arrow A5, which causes the gear 87 to rotate about a third rotation axis 99 in the direction as indicated by the arrow A6 such that the gear 87 moves along the third threaded member 106 in the pedal assembly vertical direction (i.e., in the +/−Z direction) in the direction indicated by the arrow A11. In some embodiments, the gear 87 is molded of a suitable plastic material such as, for example, nylon. In other embodiments, the gear 87 is formed of metal such as, for example steel.

An activation of the second threaded member 86 rotates the gear 87 which moves or rotates about or around the third threaded member 106 in the pedal assembly vertical direction (i.e., in the +/−Z direction), as discussed in greater detail herein. As such, the second axle 74 moves within the second elongated slot 70 in the direction as indicated by the arrow A7. The third axle 84 moves within the third pair of elongated slots 78 in the direction as indicated by the arrow A8, as discussed in greater detail herein.

In some embodiments, the second threaded member 86 is formed of resin such as, for example, nylon. In other embodiments, the second threaded member 86 is formed of a metal such as, for example, steel. In some embodiments, a portion of the second threaded member 86 may be supported by the lower housing 18, which attaches the second threaded member 86 to the lower housing 18 above the third pair of elongated slots 78 and below the second elongated slot 70 in the pedal assembly vertical direction (i.e., in the +/−Z direction). Further, in some embodiments, the third threaded member 106 is formed of resin such as, for example, nylon. In other embodiments, the third threaded member 106 is formed of a metal such as, for example, steel. In some embodiments, a portion of the third threaded member 106 may be supported by the lower housing 18, which attaches the third threaded member 106 to the lower housing 18 behind the third pair of elongated slots 78 in the pedal assembly longitudinal direction (i.e., in the +/−X direction).

Now referring to FIGS. 1, 6, 8 and 13, in operation, to move the accelerator pedal assembly 12 into the stowed position, the actuator 54 actuates the second threaded member 86 to rotate via the flexible cable 88. The second threaded member 86 rotates the gear 87, thereby moving or rotating the gear 87 in the pedal assembly vertical direction (i.e., in the +/−Z direction) in the direction indicated by the arrow A11. As such, the second axle 74 moves within the second elongated slot 70 in the direction as indicated by the arrow A7 from the first terminating portion 81 to the second terminating portion 77. Simultaneously, the third axle 84 moves linearly within the third pair of elongated slots 78 in the pedal assembly vertical direction (i.e., in the +/−Z direction), indicated by the arrow A8, from the first terminating portion 83b to the second terminating portion 83a.

The movement of the third axle 84 lifts the lower portion 82 of the ETC bracket 64, thereby moving or rotating the accelerator pedal assembly 12. The movement or rotation of the accelerator pedal assembly 12 moves the upper portion 72 of an ETC bracket 64 connected to the second axle 74, guided by the second elongated slot 70, in the pedal assembly longitudinal direction (i.e., in the +/−X direction). Such movement moves the accelerator pedal pad 68 toward the interior surface 92b of the at least one receiving cavity 90. Together, the second elongated slot 70 and the third pair of elongated slots 78 guide the accelerator pedal pad 68 between the use position and the stowed position.

Still referring to FIGS. 1, 6, 8 and 13, in operation, to move the pedal assembly 14 into the stowed position, the actuator 54 actuates the third threaded member 122 to move in the direction indicated by the arrow A4 and the gear 124 in the direction of the arrow A12 such that the first threaded member 50 moves along the axis 56 in the direction indicated by the arrow A10. This rotation or movement moves the first axle 40 in a pedal assembly longitudinal direction (i.e. +/−X direction) from the first terminating portion 41a to the second terminating portion 41b in the direction of arrow A2. It should be appreciated that when the actuator 54 rotates to put the pedal assembly 14 in the stowed position, the rotation of movement of the first threaded member 50 also moves the bracket 53 and the pivot portion 36 of the pedal assembly 14 in the pedal assembly longitudinal direction (i.e. in the +X direction) away from the upper user facing surface 20, and rotates or moves the pedal pad 38 toward the interior surface 92a of the at least one receiving cavity 90 about the stowed axis 120, in the direction indicated by arrow A9. The elongated slots 46 guides the pedal arm 32 between the use position and the stowed position.

To return the accelerator pedal assembly 12 and/or the pedal assembly 14 to the previous position (e.g., from the use position to the stowed position and/or from the stowed position to the use position), the actuator 54 rotates so to move the third threaded member 122 and/or the second threaded member 86, respectively, in the opposite direction to move the components in the opposite direction as described above. In some embodiments, the user or driver may position the pedals between the use and stowed positions. In other embodiments, an electronic control unit (ECU) may determine whether the vehicle is in an autonomous driving mode and activate the actuator 54 to change the position of the pedals. For example, when the vehicle is set to an autonomous driving mode, the ECU activates the actuator 54 to move the pedals into the stowed position.

It should be appreciated that the ECU and the pedal assembly 10 may further disable the any pedal when in the stowed position and/or when the pedals should be in the stowed position such that the user or driver cannot depress the pedal pad enough to impact the vehicle operating conditions. For example, in some embodiments, the pedal assembly 14 requires a predetermined amount of depression before a braking system of the vehicle is engaged. Therefore, when the pedal assembly 14 is not in the stowed position but also not extended in the use position enough to permit the predetermined amount of depression of the pedal required, the ECU may intervene. In other words, the accelerator pedal assembly 12 is configured to control the acceleration of a vehicle, and the electronic control unit disables the acceleration control and/or other control, such as braking, when the accelerator pedal assembly 12 and/or the pedal assembly 14 is in the stowed position or should be in the stowed position.

Referring back to FIGS. 1-5 and 8-12, in some embodiments, in the use positon, the position of the accelerator pedal assembly 12 and the pedal assembly 14 may be adjusted by the operator of the vehicle in the pedal assembly longitudinal direction (i.e., in the +/−X direction) as well as in the pedal assembly vertical direction (i.e., in the +/−Z direction) between a plurality of adjustment positions in the use position. As such, the first pair of elongated slots 46, the second elongated slot 70 and/or the third pair of elongated slots 78 may be used to provide the needed movement of the accelerator pedal assembly 12 and the pedal assembly 14 into any desired use positon. That is, it should be appreciated that the accelerator pedal assembly 12 and the pedal assembly 14 may be positioned at any desired position between these end point positions (i.e., terminating portions of the slots). In one embodiment, the position of the accelerator pedal assembly 12 and the pedal assembly 14 may be adjusted in the pedal assembly longitudinal direction (i.e., in the +/−X direction) and/or in the pedal assembly vertical direction (i.e., in the +/−Z direction) when the driver engages a control switch which activates rotation of the actuator 54 in the desired direction.

That is, it should be appreciated that when the first axle 40 is located at the first terminating portion 41a, the pedal assembly 14 is in the use position. A plurality of use positions are defined by the first axle 40 located between the first terminating portion 41a and the second terminating portion 41b. When the first axle 40 is located at the second terminating portion 41b, the pedal assembly 14 is in the stowed position, with the pedal pad 38 located in the at least one receiving cavity 90.

When the third axle 84 is located at the first terminating portion 83b and the second axle 74 is at the first terminating portion 81, the accelerator pedal assembly 12 is in the use position. A plurality of use positions are defined by the third axle 84 positioned between the first terminating portion 83b and the second terminating portion 83a and the second axle 74 positioned between the first terminating portion 81 and the second terminating portion 77.

Thus disclosed is a pedal assembly in which the each pedals are movable between a plurality of use positions and a stowed position in which in the stowed position the pedals are not useable. Further, in the stowed position, the pedals of the pedal assembly are positioned below a surface of the lower housing to permit unobstructed leg and foot room in a driver floorboard during autonomous driving.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A pedal assembly, comprising:
a lower housing having an upper surface;
a receiving cavity positioned in the lower housing, at least a portion of the receiving cavity is positioned below the upper surface in a pedal assembly vertical direction; and
a pedal arm having a pedal pad, the pedal arm is movable between a stowed position and a use position,
wherein in the stowed position, the pedal pad is positioned in the receiving cavity and below the upper surface in the pedal assembly vertical direction such that access to the pedal pad is prohibited, and in the use position, the pedal pad is positioned above the receiving cavity and the upper surface in the pedal assembly vertical direction such that access to the pedal pad is permitted.

2. The pedal assembly of claim 1, further comprising:
an upper housing positioned above the lower housing in the pedal assembly vertical direction,
wherein the pedal arm has a pivot end opposite the pedal pad, the pivot end is pivotally coupled to the upper housing at the pivot end.

3. The pedal assembly of claim 2, further comprising:
a first projection extending from a user-facing surface of the upper housing;
a pair of elongated slots positioned within the first projection in the upper housing; and
an axle laterally extending into the pair of elongated slots in a pedal assembly lateral direction, wherein the pedal arm is movably coupled to the upper housing at the axle to guide the pedal arm between the use position and the stowed position.

4. The pedal assembly of claim 3, wherein the pair of elongated slots positioned within the first projection in the upper housing is angled with respect to a top wall of the first projection.

5. The pedal assembly of claim 4, wherein the pair of elongated slots positioned within the first projection in the upper housing is linear in orientation with respect to the top wall of the first projection.

6. The pedal assembly of claim 4, wherein the pair of elongated slots positioned within the first projection in the upper housing is curvilinear in orientation with respect to the top wall of the first projection.

7. The pedal assembly of claim 3, further comprising:
a second pedal arm having a second pivot end and an opposite second pedal pad, the second pivot end is pivotally coupled to the upper housing at the second pivot end, the second pedal arm is movable between the stowed position and the use position, and
a second receiving cavity positioned in the lower housing, at least a portion of the second receiving cavity is positioned below the upper surface in the pedal assembly vertical direction,
wherein in the stowed position, the second pedal pad is positioned in the second receiving cavity and below the upper surface in the pedal assembly vertical direction such that access to the second pedal pad is prohibited and in the use position, the second pedal pad is positioned above the second receiving cavity and the upper surface in the pedal assembly vertical direction such that access to the second pedal pad is permitted.

8. The pedal assembly of claim 7, further comprising:
a second projection extending from the user-facing surface of the upper housing;
a second elongated slot positioned within the second projection in the upper housing; and
a second axle laterally extending into the second elongated slot in the pedal assembly lateral direction, wherein the second pedal arm is movably coupled to the upper housing at the second axle to guide the second pedal arm between the use position and the stowed position,
wherein the second projection is positioned below the first projection in the pedal assembly vertical direction.

9. The pedal assembly of claim 8, wherein the second elongated slot positioned within the second projection in the upper housing is arcuate in orientation with respect to a top surface of the second projection.

10. A combination pedal assembly, comprising:
a lower housing having an upper surface;
a pair of receiving cavities positioned in the lower housing, at least a portion of each of the pair of receiving cavities are positioned below the upper surface in a pedal assembly vertical direction;
a first pedal arm having a first pedal pad, the first pedal arm is movable between a stowed position and a use position; and
a second pedal arm having a second pedal pad, the second pedal arm is movable between the stowed position and the use position,
wherein in the stowed position, the first and second pedal pads are positioned into the corresponding pair of receiving cavities and below the upper surface in the pedal assembly vertical direction such that access to the first and second pedal pads is prohibited, and in the use position, the first and second pedal pads are positioned above the pair of receiving cavities and the upper surface in the pedal assembly vertical direction such that access to the first and second pedal pads is permitted.

11. The combination pedal assembly of claim 10, further comprising:
an upper housing positioned above the lower housing in the pedal assembly vertical direction,
wherein the first pedal arm has a first pivot end opposite of the first pedal pad, the first pivot end is pivotally coupled to the upper housing at the first pivot end, and
wherein the second pedal arm has a second pivot end opposite the second pedal pad, the second pivot end is pivotally coupled to the upper housing at the second pivot end.

12. The combination pedal assembly of claim 11, further comprising:
a first projection extending from a user-facing surface of the upper housing;
a first pair of spaced apart elongated slots positioned within the first projection in the upper housing; and
a first axle laterally extending into the first pair of spaced apart elongated slots in a pedal assembly lateral direction, wherein the first pedal arm is movably coupled to the upper housing at the first axle to guide the first pedal arm between the use position and the stowed position.

13. The combination pedal assembly of claim 12, wherein the first pair of spaced apart elongated slots positioned within the first projection in the upper housing are angled with respect to a top wall of the first projection.

14. The combination pedal assembly of claim 13, wherein the first pair of spaced apart elongated slots positioned within the first projection in the upper housing are linear in orientation with respect to the top wall of the first projection.

15. The combination pedal assembly of claim 13, wherein the first pair of spaced apart elongated slots positioned within the first projection in the upper housing are curvilinear in orientation with respect to the top wall of the first projection.

16. The combination pedal assembly of claim 15, further comprising:
a third projection extending from a front surface of the lower housing, the third projection extending in the pedal assembly vertical direction;
a third pair of elongated slots positioned within the third projection in the lower housing; and
a third axle laterally extending into the third pair of elongated slots in the pedal assembly vertical direction, wherein the second pedal arm is movably coupled to the lower housing at the third axle to guide the second pedal arm between the use position and the stowed position.

17. The combination pedal assembly of claim 12, further comprising:
a second projection extending from the user-facing surface of the upper housing;
a second elongated slot positioned within the second projection in the upper housing; and
a second axle laterally extending into the second elongated slot in the pedal assembly lateral direction, wherein the second pedal arm is movably coupled to the upper housing at the second axle to guide the second pedal arm between the use position and the stowed position,
wherein the second projection is positioned below the first projection in the pedal assembly vertical direction.

18. The combination pedal assembly of claim 17, wherein the second elongated slot positioned within the second projection in the upper housing is arcuate in orientation with respect to a top surface of the second projection.

19. A pedal assembly comprising:
a floorboard;
a lower housing at least partially positioned below the floorboard in a pedal assembly vertical direction;
a receiving cavity positioned in the lower housing, at least a portion of the receiving cavity is positioned below the floorboard in the pedal assembly vertical direction; and
a pedal arm having a pedal pad, the pedal arm is movable between a stowed position and a use position,
wherein in the stowed position, the pedal pad is positioned in the receiving cavity and below the floorboard in the pedal assembly vertical direction such that access to the pedal pad is prohibited and in the use position, the pedal pad is positioned above the receiving cavity and the floorboard in the pedal assembly vertical direction such that access to the pedal pad is permitted.

20. The pedal assembly of claim 19, further comprising:
an upper housing positioned above the floorboard and the lower housing in the pedal assembly vertical direction;
wherein the pedal arm has a pivot end opposite the pedal pad, the pivot end is pivotally coupled to the upper housing at the pivot end, and
wherein the pivotal movement of the pivot end of the pedal arm is a different movement than the movement of the pedal arm movable between the stowed position and the use position.

\* \* \* \* \*